United States Patent
Sahashi et al.

(10) Patent No.: US 7,515,029 B2
(45) Date of Patent: Apr. 7, 2009

(54) STARTING DEVICE FOR SINGLE-PHASE INDUCTION MOTOR

(75) Inventors: Mikio Sahashi, Kani (JP); Akihiko Matsuya, Nagoya (JP); Shinichi Iwasaki, Komaki (JP); Motoi Okada, Kasugai (JP); Kazuo Itoh, Seto (JP)

(73) Assignee: Panasonic Corporation, Osaka (JP)

( * ) Notice: Subject to any disclaimer, the term of this patent is extended or adjusted under 35 U.S.C. 154(b) by 434 days.

(21) Appl. No.: 10/537,010

(22) PCT Filed: Nov. 27, 2003

(86) PCT No.: PCT/JP03/15191

§ 371 (c)(1),
(2), (4) Date: May 27, 2005

(87) PCT Pub. No.: WO2004/051836

PCT Pub. Date: Jun. 17, 2004

(65) Prior Publication Data

US 2006/0163956 A1    Jul. 27, 2006

(30) Foreign Application Priority Data

Nov. 29, 2002  (JP)  .............................. 2002-347810
Aug. 21, 2003  (JP)  .............................. 2003-297295
Aug. 21, 2003  (JP)  .............................. 2003-297296

(51) Int. Cl.
H01H 37/52  (2006.01)
H01H 37/54  (2006.01)
H02K 17/32  (2006.01)

(52) U.S. Cl. ........................................ 337/89; 337/102
(58) Field of Classification Search ................ 337/89, 337/102
See application file for complete search history.

(56) References Cited

U.S. PATENT DOCUMENTS

| 3,695,054 | A | * | 10/1972 | Barry .......................... 62/115 |
| 3,718,879 | A | * | 2/1973 | Perry .......................... 337/95 |
| 3,921,117 | A | * | 11/1975 | Blaha .......................... 338/13 |
| 4,042,860 | A | * | 8/1977 | Woods et al. .................. 361/25 |
| 4,086,558 | A | * | 4/1978 | Pejouhy et al. ............... 337/102 |
| RE31,367 | E | * | 8/1983 | D'Entremont ................ 361/27 |
| 4,574,229 | A | * | 3/1986 | Kim ........................... 318/788 |
| 4,635,026 | A | * | 1/1987 | Takeuchi ................ 338/22 SD |
| 4,908,595 | A | * | 3/1990 | Niino .......................... 337/105 |
| 5,153,805 | A | * | 10/1992 | Tennant et al. ................ 361/27 |
| 5,291,085 | A | * | 3/1994 | Kawashima et al. ...... 310/68 C |
| 5,345,126 | A | * | 9/1994 | Bunch ....................... 310/68 C |
| 5,428,493 | A | * | 6/1995 | Takeuchi et al. ............... 361/27 |
| 5,451,853 | A | * | 9/1995 | Itoh ........................... 318/788 |
| 5,729,416 | A | * | 3/1998 | Renkes et al. ................. 361/23 |

(Continued)

FOREIGN PATENT DOCUMENTS

JP           53-66596          6/1978

(Continued)

*Primary Examiner*—Anatoly Vortman
(74) *Attorney, Agent, or Firm*—Lucas & Mercanti, LLP

(57) ABSTRACT

A starter of single-phase induction motor having main winding and auxiliary winding energized by alternating current power source, including a casing, a positive characteristic thermistor connected in series to the auxiliary winding, an auxiliary positive characteristic thermistor connected parallel to the positive characteristic thermistor, a bimetal, and an enclosed compartment accommodated in the casing for enclosing the snap action bimetal and auxiliary positive characteristic thermistor.

3 Claims, 28 Drawing Sheets

(B)

U.S. PATENT DOCUMENTS

| | | | | |
|---|---|---|---|---|
| 5,870,014 | A | * 2/1999 | Nield et al. | 337/362 |
| 5,977,859 | A | 11/1999 | Kawamura et al. | |
| 6,495,982 | B2 * | 12/2002 | Katsumata et al. | 318/471 |
| 2001/0054873 | A1 * | 12/2001 | Katsumata et al. | 318/471 |
| 2002/0018326 | A1 | 2/2002 | Sugawara | |

FOREIGN PATENT DOCUMENTS

| | | | |
|---|---|---|---|
| JP | 56162985 A | * | 12/1981 |
| JP | 04289786 A | * | 10/1992 |
| JP | 06-038467 | | 2/1994 |
| JP | 06068759 A | * | 3/1994 |
| JP | 06131956 A | * | 5/1994 |
| JP | 07-045171 | | 2/1995 |
| JP | 07-170697 | | 7/1995 |
| JP | 07-229371 | | 8/1995 |
| JP | 11167852 A | * | 6/1999 |
| JP | 11303745 A | * | 11/1999 |
| JP | 2000-011829 | | 1/2000 |
| JP | 2001-068172 | | 3/2001 |
| JP | 2001061285 A | * | 3/2001 |

* cited by examiner

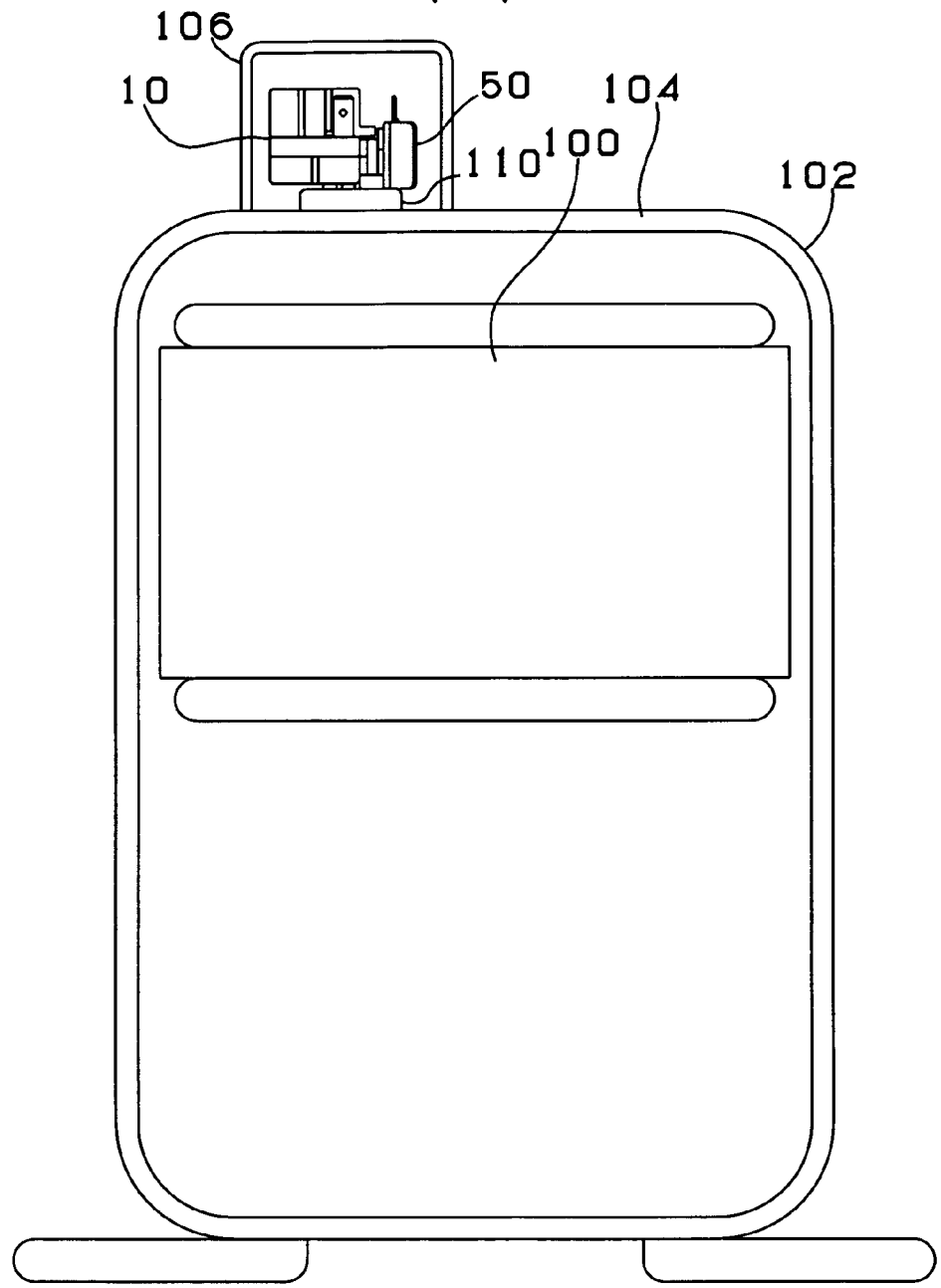
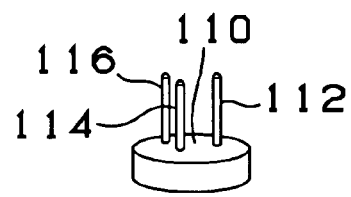

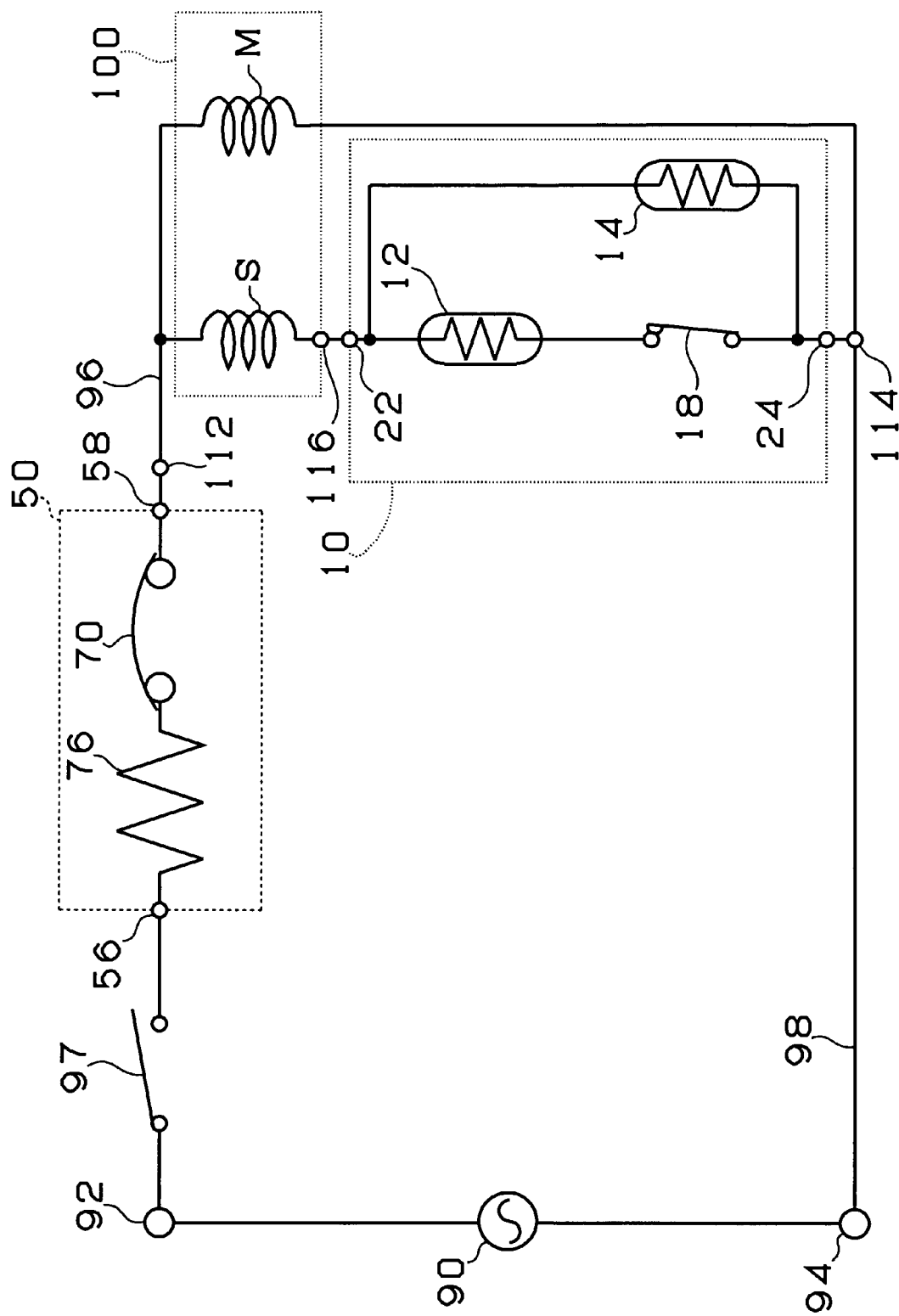

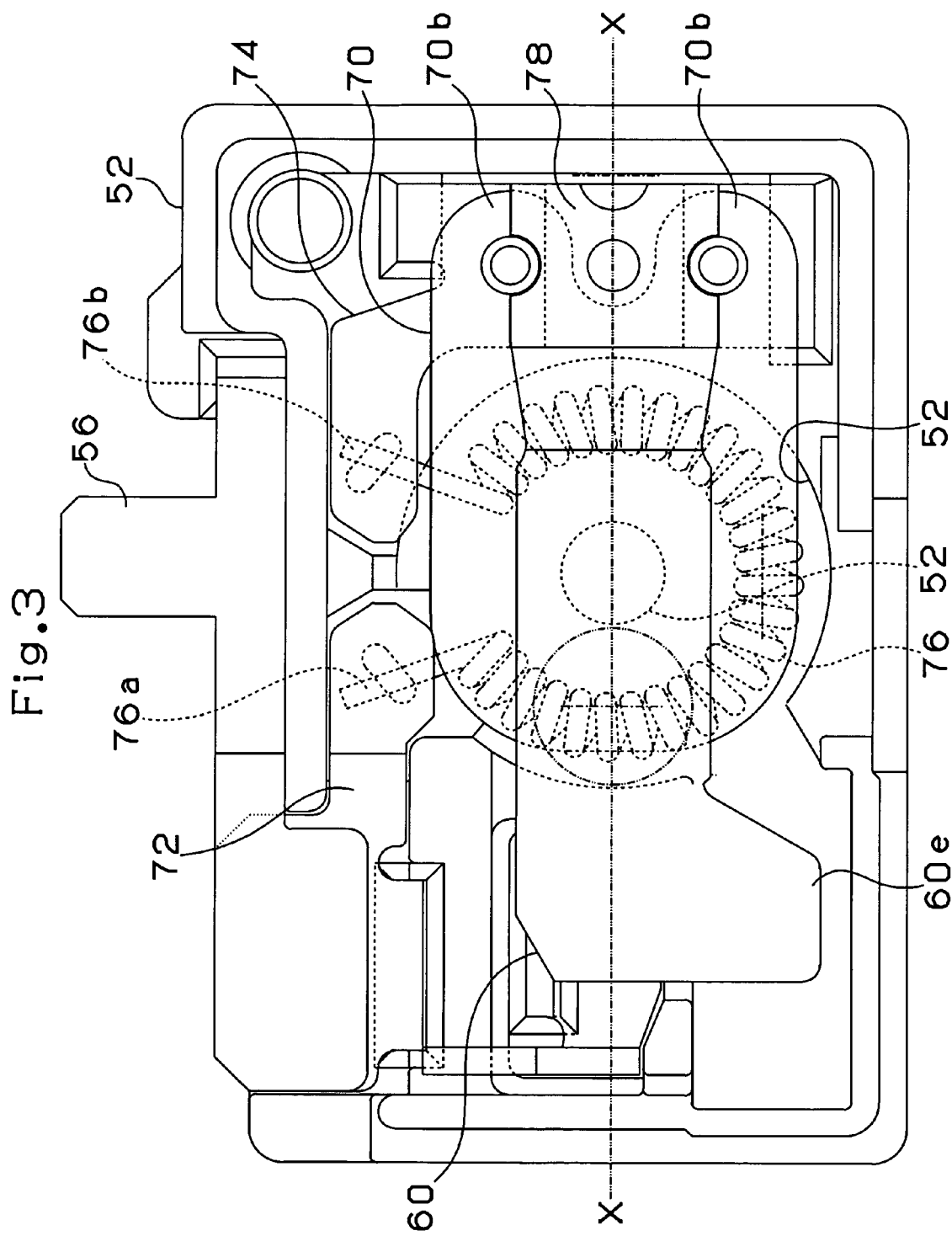

Fig.4
(A)
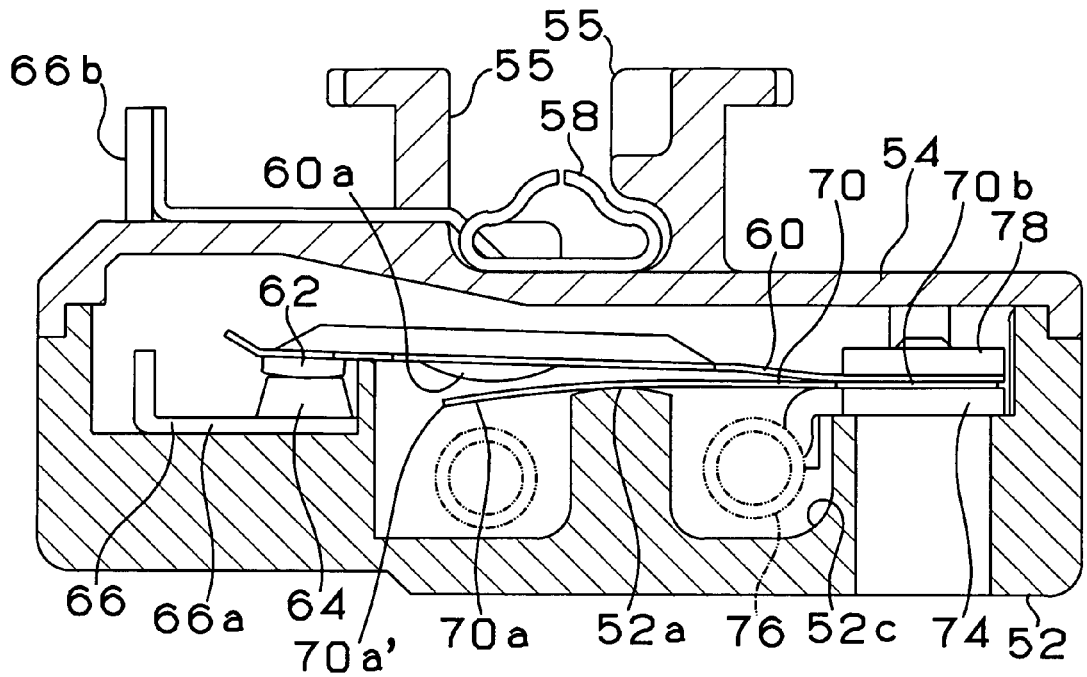
(B)
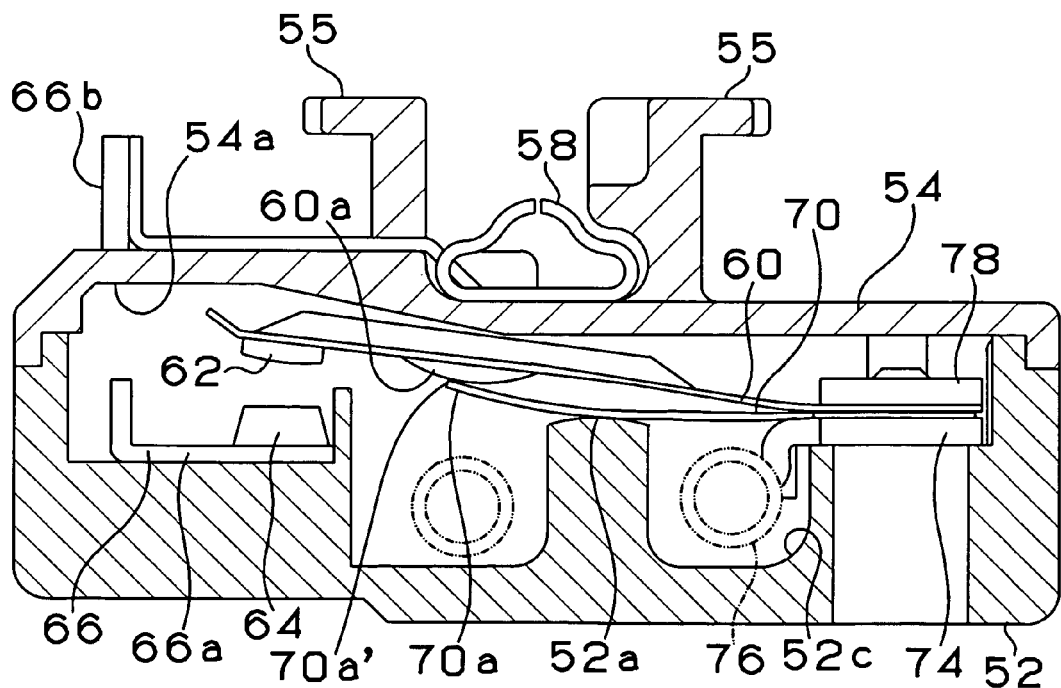

Fig.6
(A)
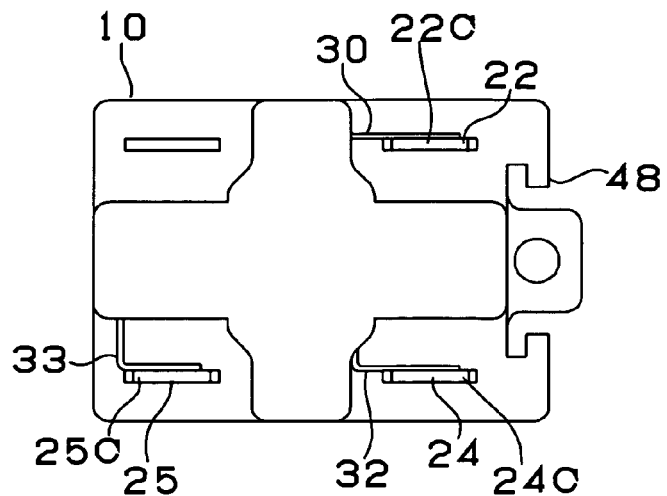
(B)
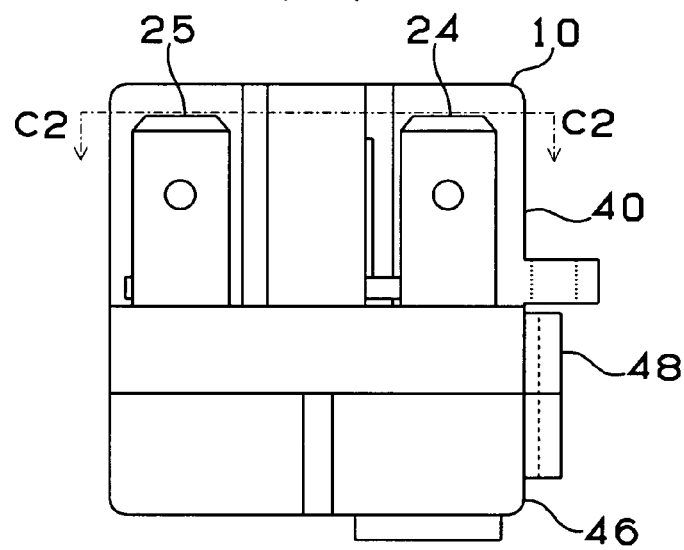
(C)
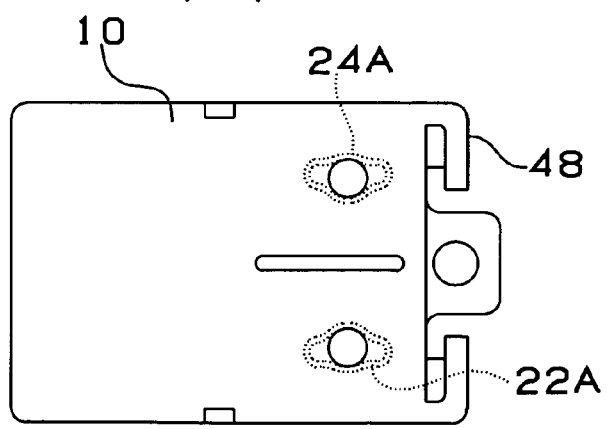

Fig.7
(A)
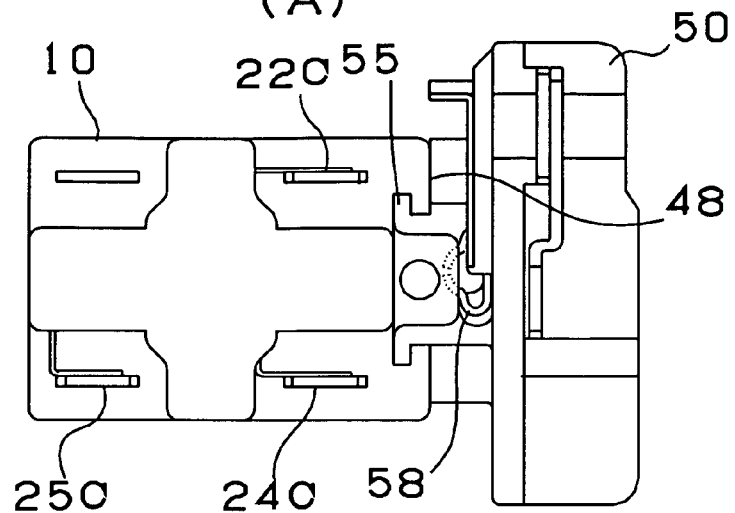
(B)
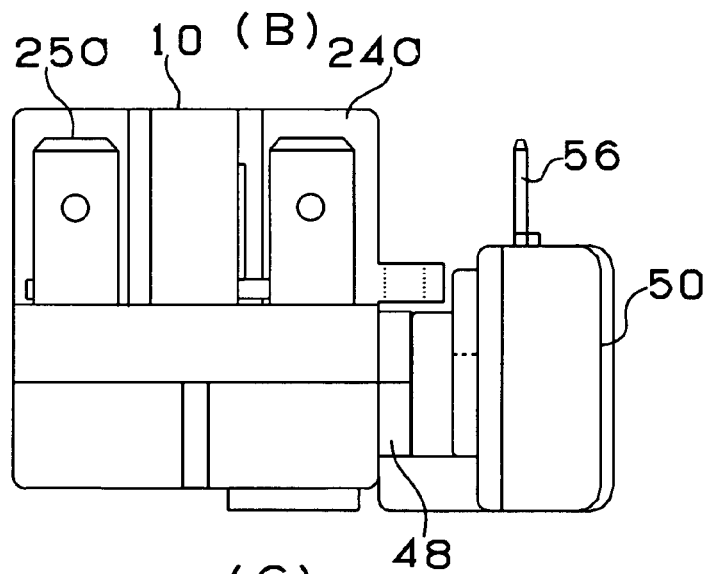
(C)
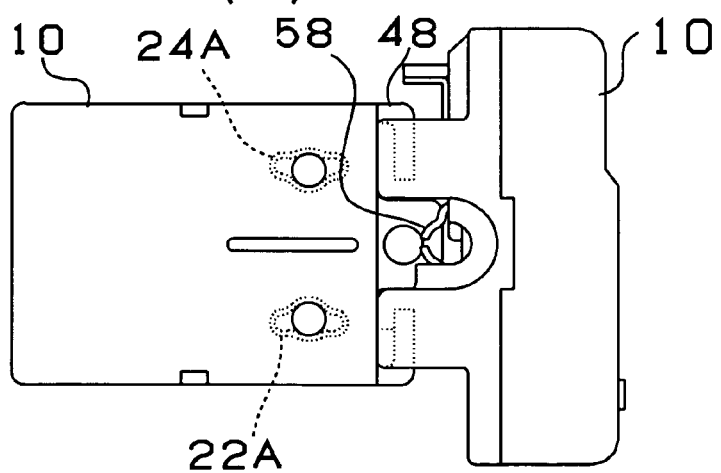

Fig.8
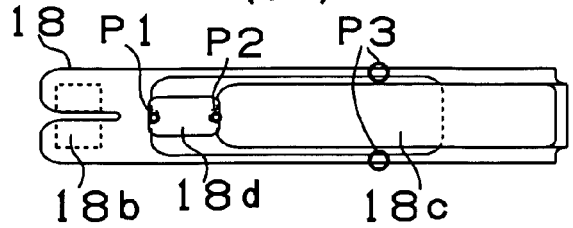
(A)
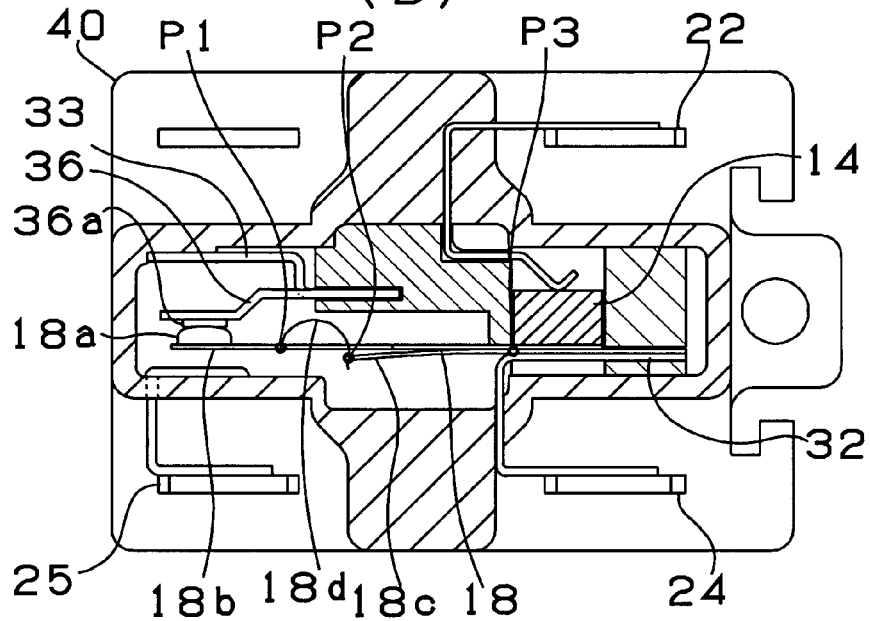
(B)
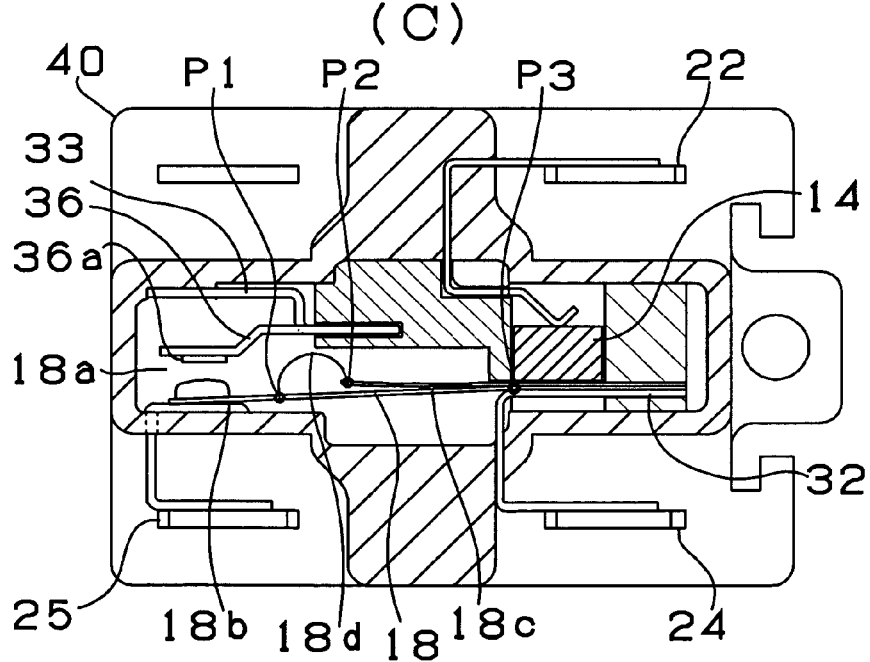
(C)

Fig.9
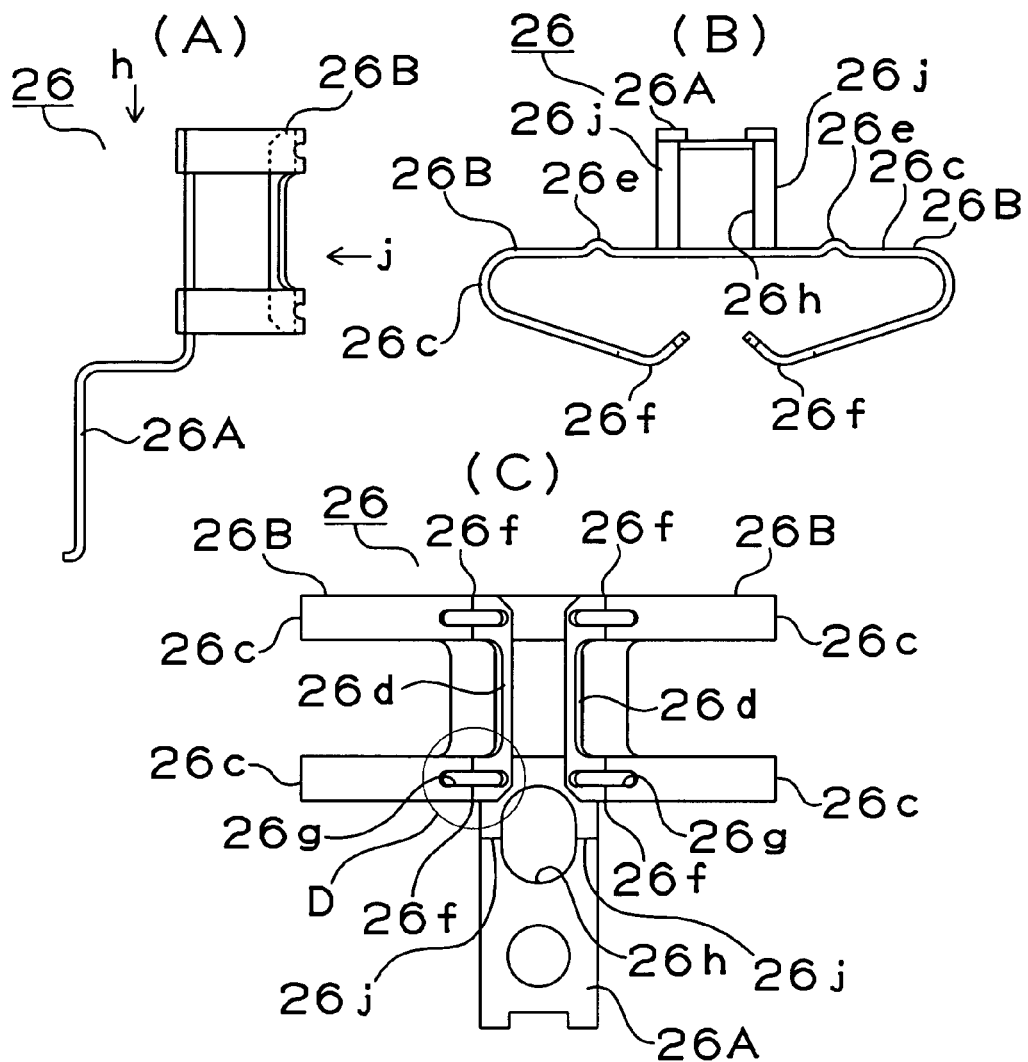
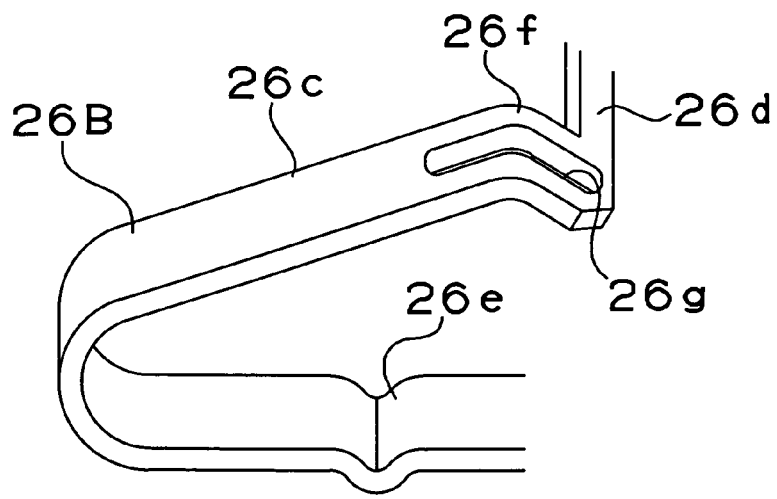

Fig.10
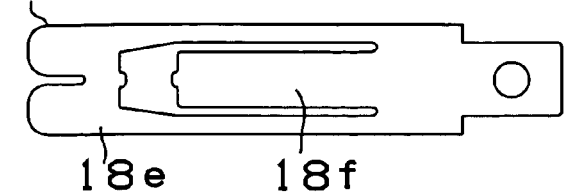
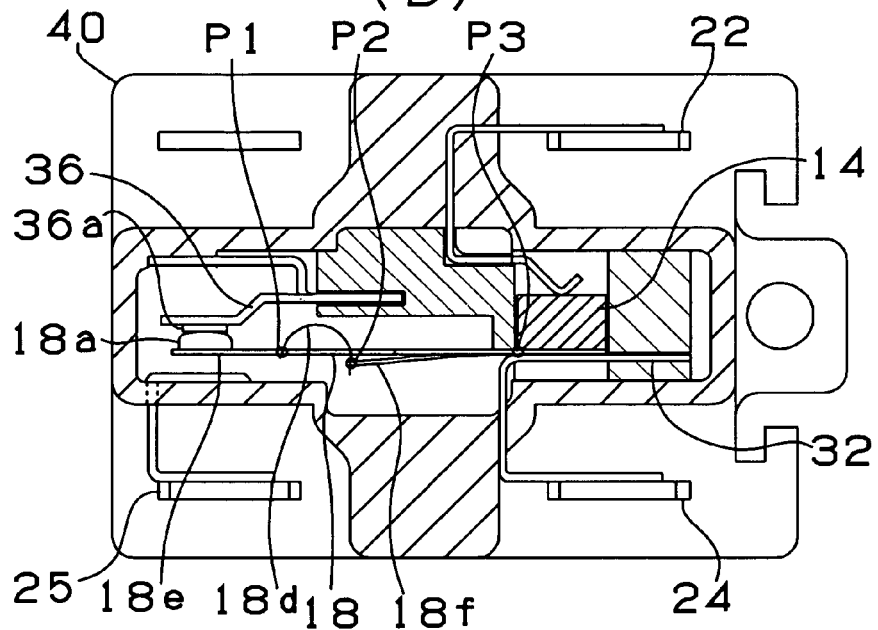
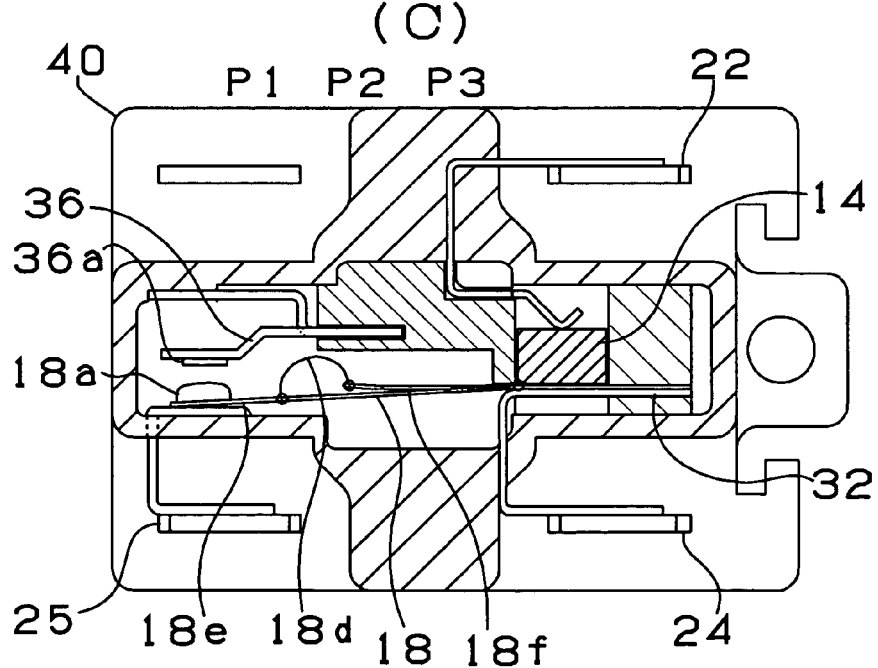

Fig.12
(A) 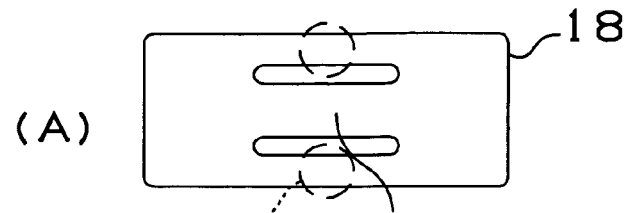
(B) 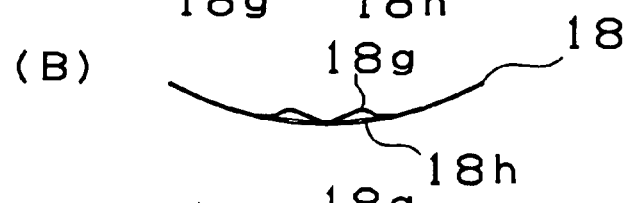
(C) 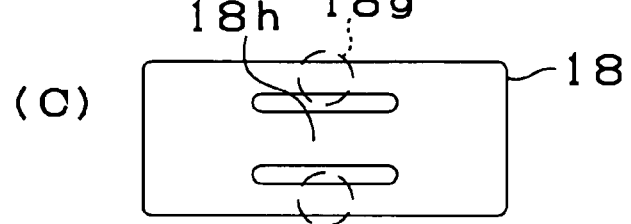
(D) 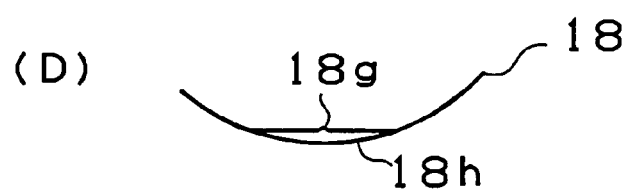
(E) 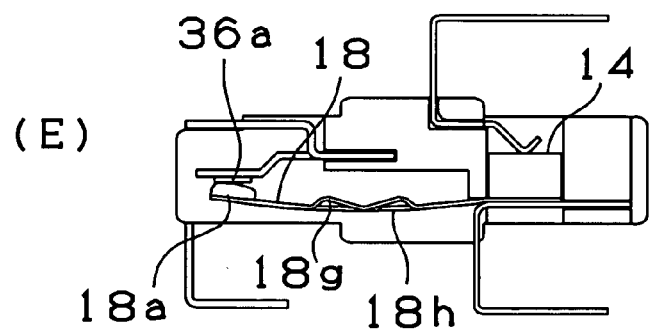
(F) 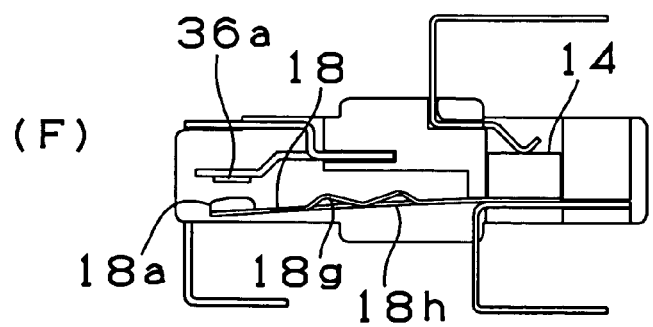

Fig.13
(A) 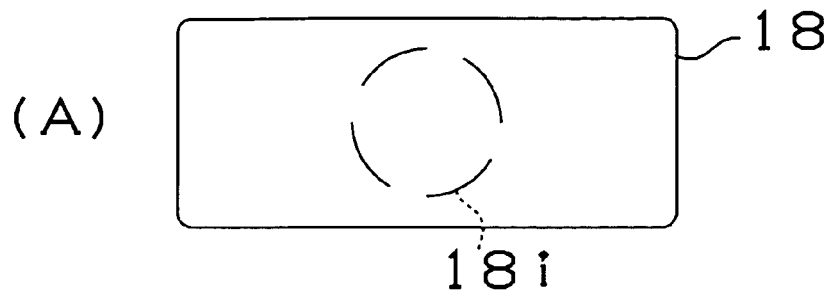
(B) 
(C) 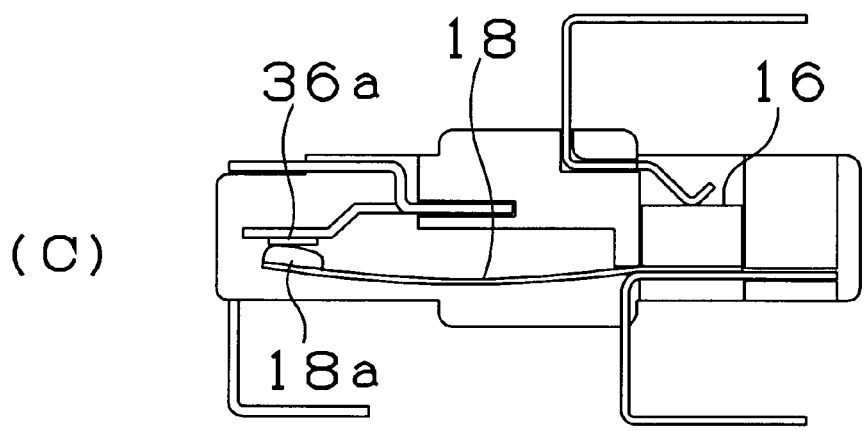
(D) 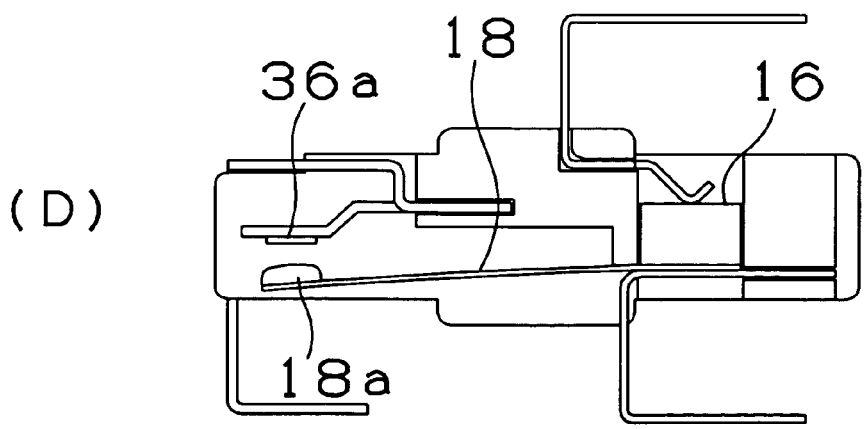

Fig.14
(A)
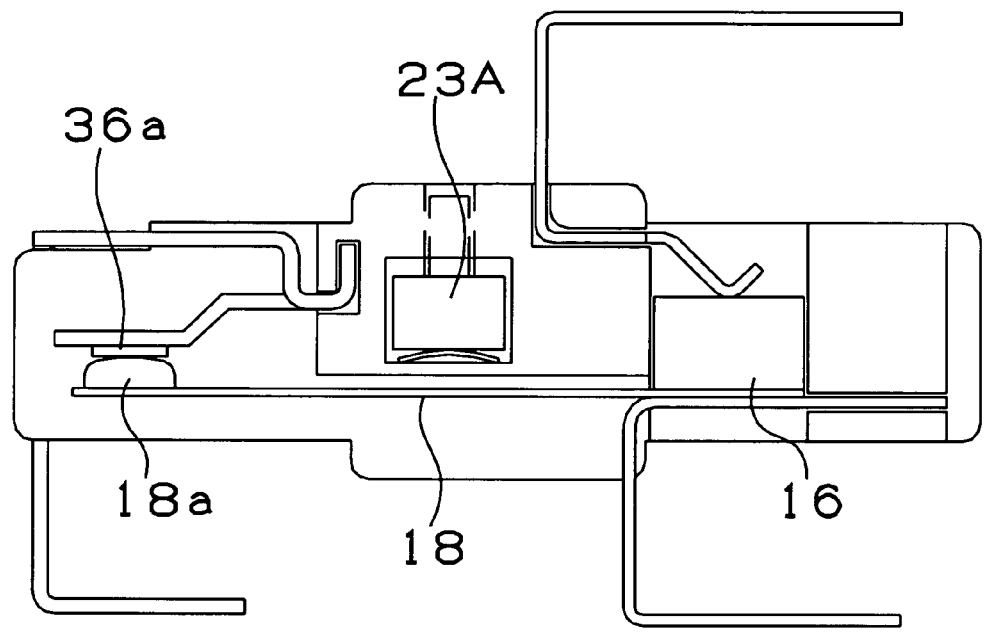
(B)
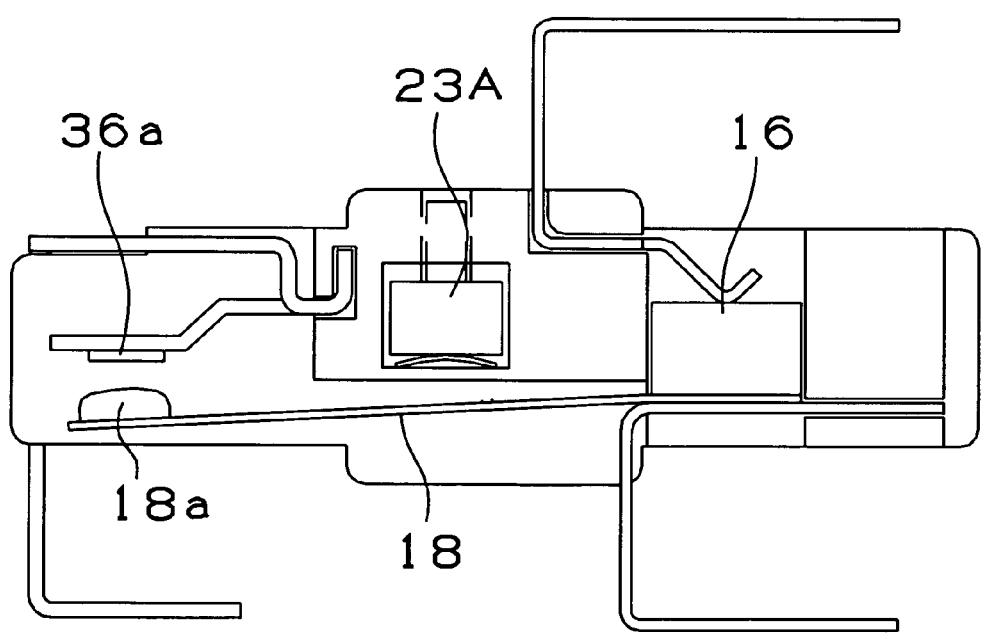

Fig.15
(A)
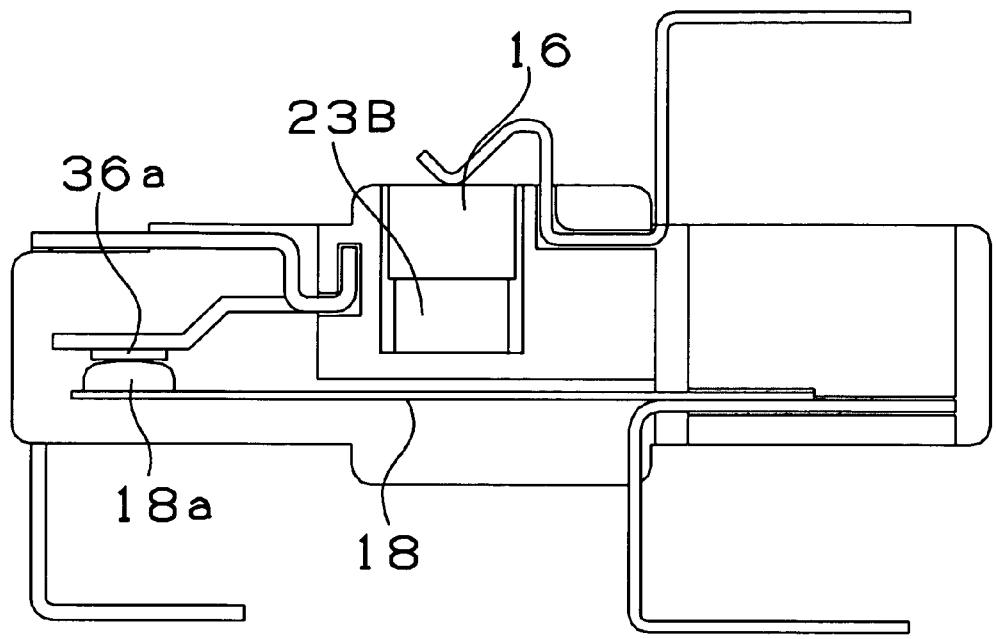
(B)
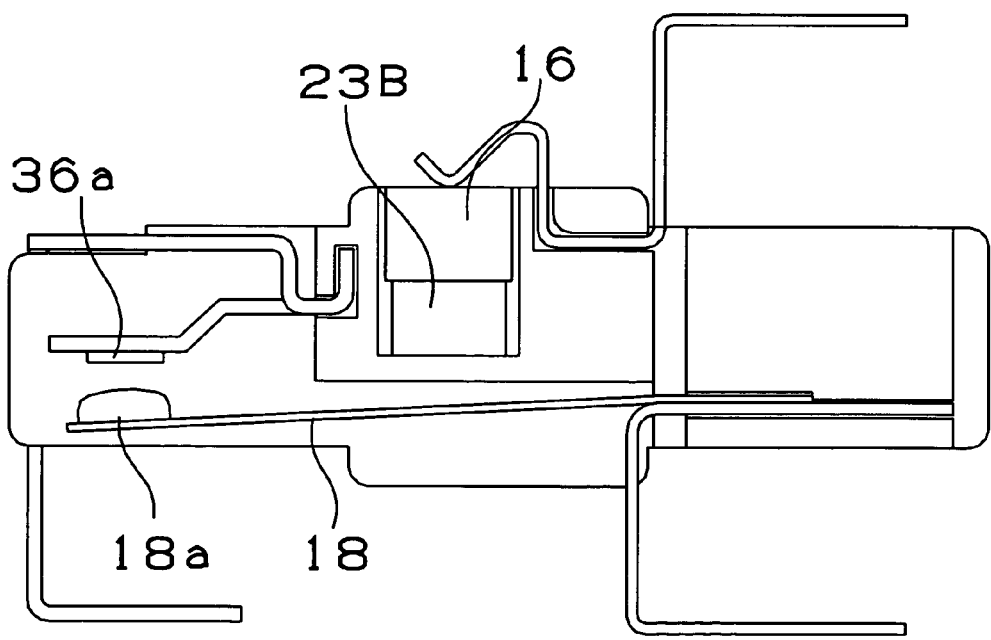

Fig.18
(A)
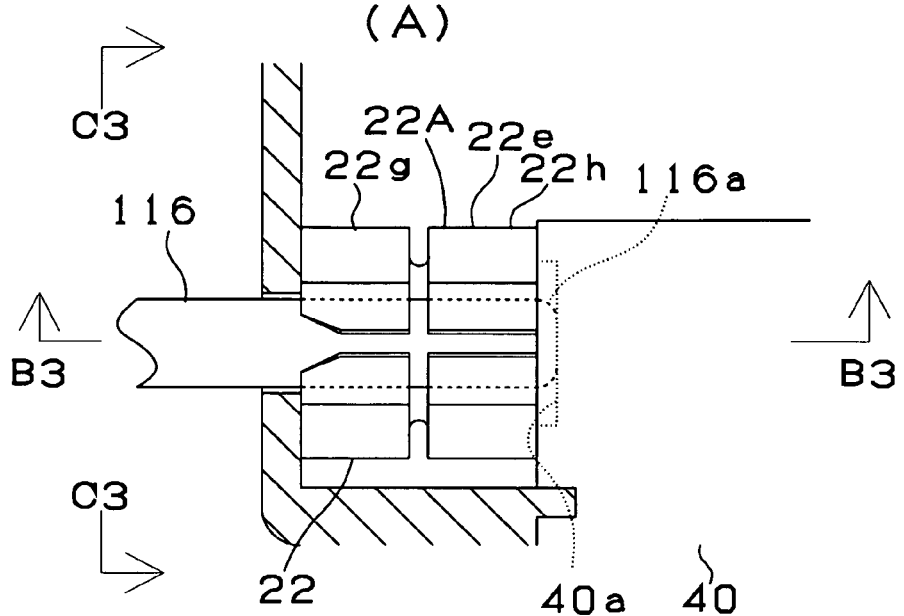
(B)
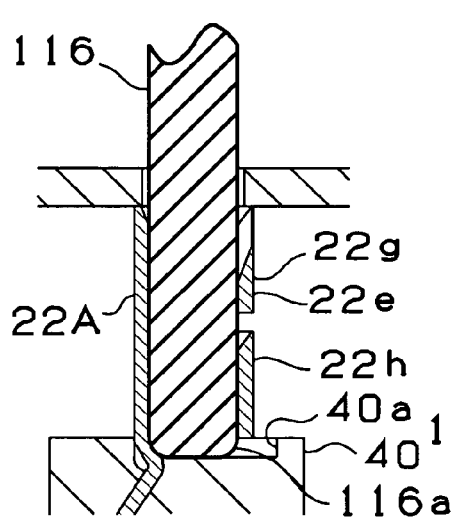
(C)
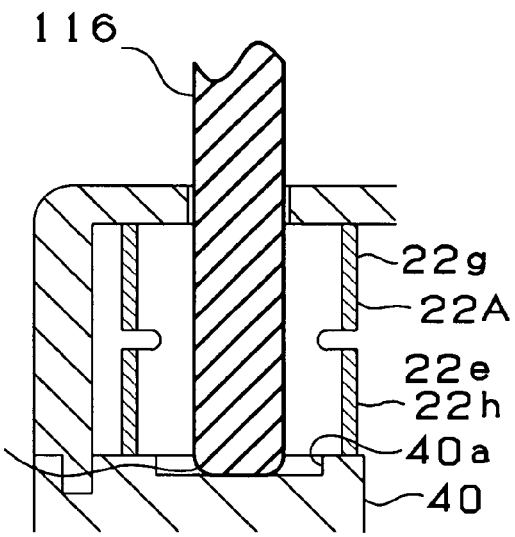
(D)
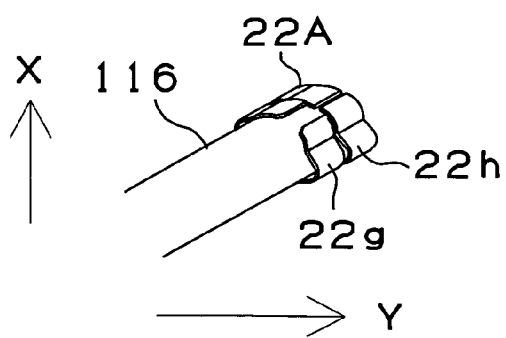

Fig.24
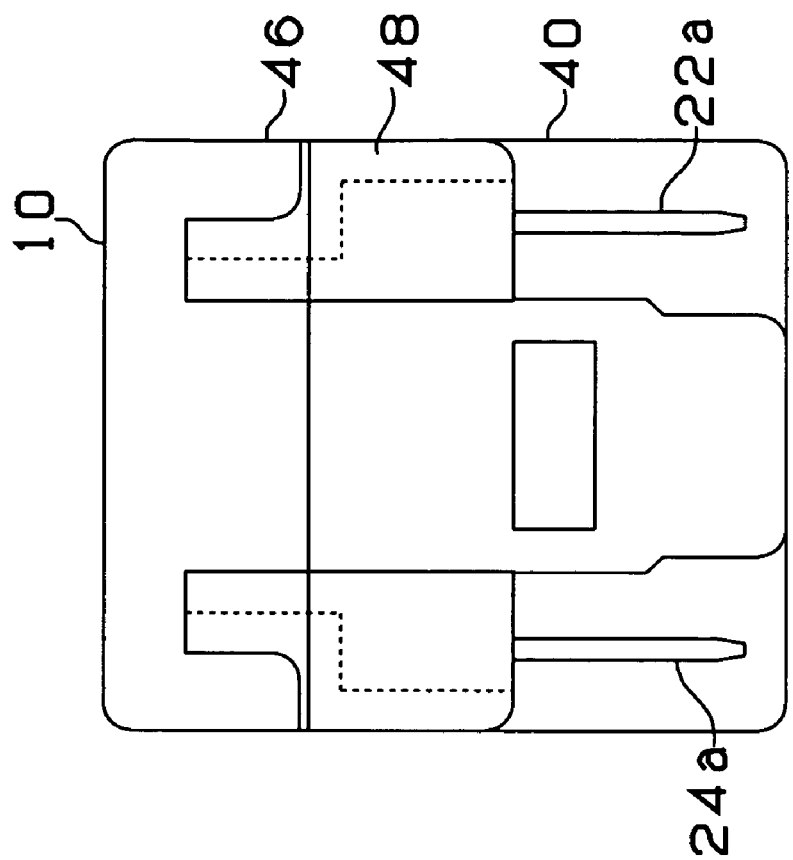
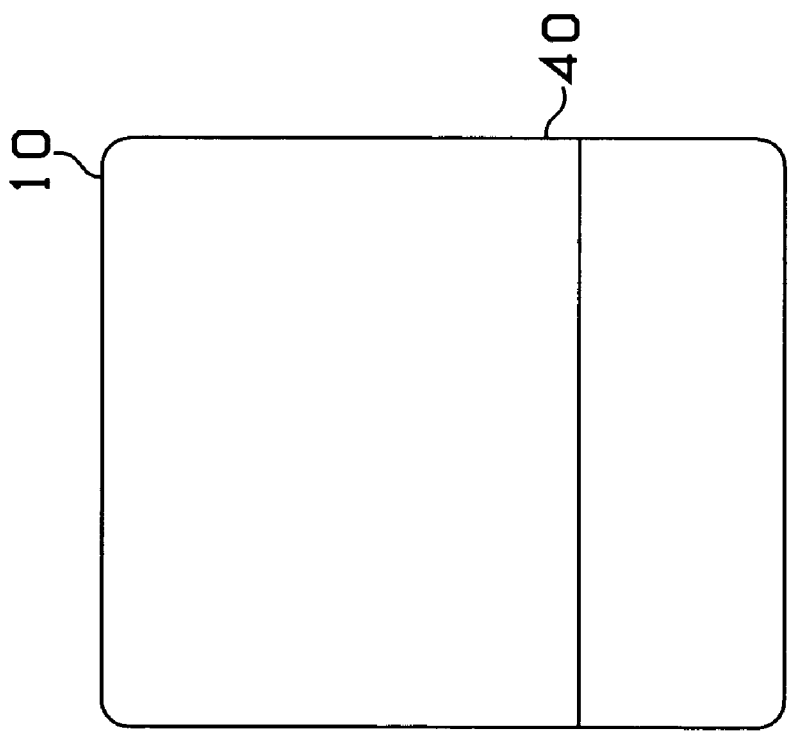

Fig.27
(A)(Prior Art)
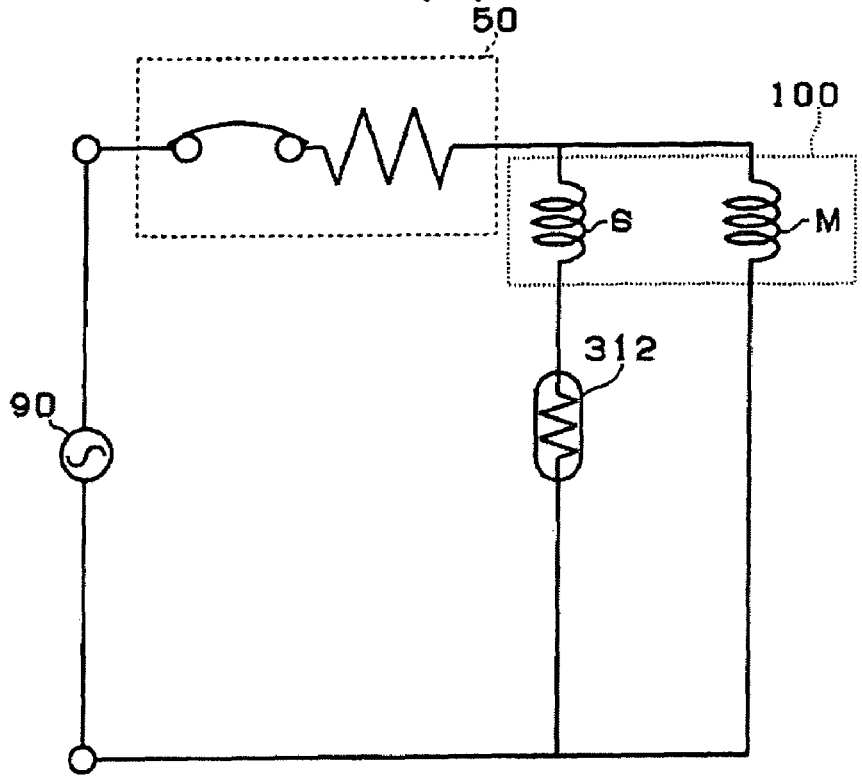
(B)(Prior Art)
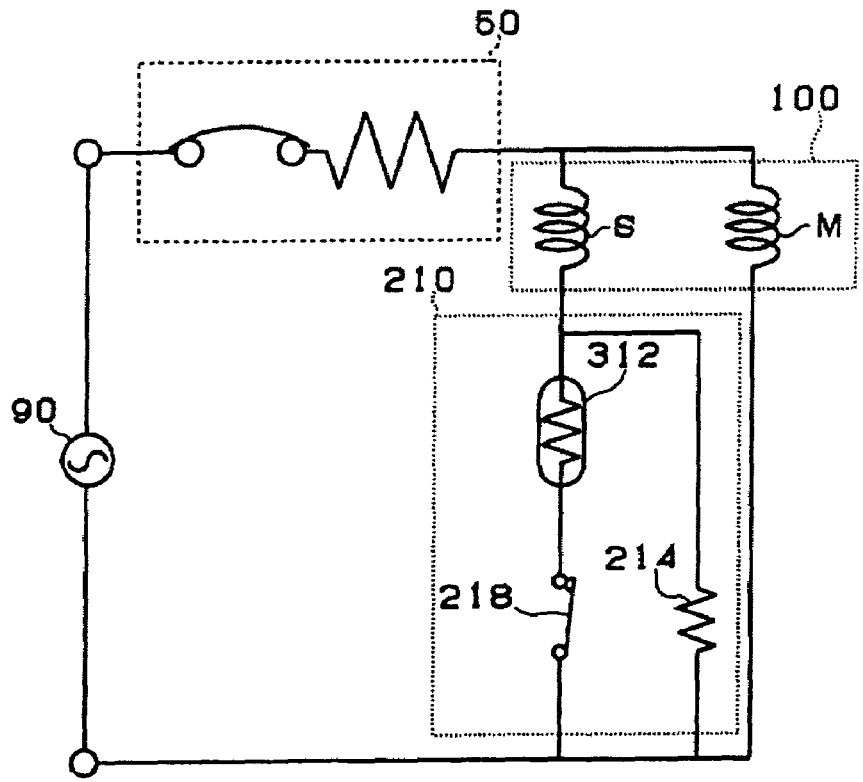

STARTING DEVICE FOR SINGLE-PHASE INDUCTION MOTOR

TECHNICAL FIELD

The present invention relates to a starter of a single-phase induction motor, such as a compressor motor for a refrigerator (enclosed motor compressor) or a pump motor.

BACKGROUND ART

Starters are often used in single-phase induction motors for driving, for example: refrigerator, air conditioner, and other enclosed compressors; this kind of starter is shown in FIG. 27 (A). The positive characteristic thermistor 312 is connected in series to an auxiliary winding S (energized by alternating-current power source 90 along with main winding M) connected in a parallel fashion with respect to auxiliary winding S. In such a starter, when starting up a single-phase induction motor 100, the positive characteristic thermistor 312 presents low electrical resistance, and a starting current flows in the auxiliary winding S. As a result of the starting current, the positive characteristic thermistor 312 becomes high in resistance, and the current to the auxiliary winding S is limited. As a result of this configuration during stationary operation (after completion of the starting of the single-phase induction motor), the positive characteristic thermistor 312 is applied with supply voltage and continues to generate heat by itself, though about 2 to 4 W of power is always wasted.

Upon stopping the conventional starter (single-phase induction motor 100), re-starting is difficult; this is due to the large thermal capacity the positive characteristic thermistor 312 has. Once reaching high temperature and high resistance during operation, it takes dozens of seconds to several minutes until it is ready to start again. If it attempts to start again before this lag time (as the positive characteristic thermistor 312 is high in resistance due to the undepleted heat), only a small current flows in the auxiliary winding S; therefore, the rotor of the motor 100 is confined. Concurrently, a large current flows through the main winding M, and the overload relay 50 is actuated to arrest the re-starting. The reset time of the overload relay is initially slightly shorter than the cooling period of the positive characteristic thermistor 312 to re-start. If the overload relay operates and resets repeatedly, the temperature becomes higher gradually, and the reset time is longer. As the reset time of the overload relay becomes longer than the cooling period of the positive characteristic thermistor 312, the motor 100 is ready to start. A similar phenomenon occurs in a compressor motor for a refrigerator: when the compartment temperature drops, the thermostat is cut off and the compressor motor stops; inversely, when the door is opened, the compartment temperature rises, turning on the thermostat. In such a case, not only does it take longer for re-starting, the life of the overload relay is subsequently shortened.

Accordingly, the present applicant previously proposed a starter for a single-phase induction motor with the structure as indicated in FIG. 27 (B) [Japanese unexamined patent publication No. H6-38467]. In the circuit, the bimetal 218 is provided in series to the positive characteristic thermistor 312 in the starter 210. By heating the bimetal 218, the current to the positive characteristic thermistor 312 is cut off. By resistance 214 reacting on smaller power consumption than the positive characteristic thermistor 312, the OFF state of the bimetal 218 is maintained, and power consumption is reduced. Further, Japanese unexamined utility model publication No. S56-38276 discloses a starter with the positive characteristic thermistor disposed in two divisions.

Further, the inclusion of the positive characteristic thermistor in the starter with the ease of mounting the single-phase induction motor, socket terminals may be provided to connect to the connection pins at the side of the single-phase induction motor. For example [as disclosed in Japanese unexamined utility model publication No. S62-115760]: three connection pins project from the single-phase induction motor; they are electrically connected by way of socket terminals on the starter.

Electrical devices receive much larger vibrations from the motor, as well as other outside forces. If the holding strength of the socket terminals is weak (i.e.: during dismounting for checking, reassembling after removal, etc.), the electric contact of the starter with the electrical devices may be insufficient. Particularly found in a starter for a large motor, the contact area is heated and terminal can be damaged. The starter may not function in these cases, allowing for the possibility of fire or other accident.

A plan view of the socket terminal incorporated in a conventional starter of prior art is shown in FIG. 28 (A), a sectional view in FIG. 28 (B), and a bottom view in FIG. 28 (C). This socket terminal 122 is connected to connection pin 212 as shown in FIG. 28 (F). In this arrangement, the stress by galling (galling force) mainly occurs in two directions X and Y. As a result, socket terminal 122A may not restore the original position due to effects of galling force as shown in FIG. 28 (G). Hence, the gripping force of connection pin 212 by socket terminal 122A is substantially lowered, and the contact resistance increases due to faulty contacts. When current flows, heat is generated, and damage of the terminal and other problems may occur.

To solve these problems, various patents have been proposed, such as Japanese unexamined patent publication No. H8-149770, and Japanese unexamined patent publication No. 2001-332159. Japanese unexamined patent publication No. H8-149770 proposes a tubular socket terminal with four grooves provided along the insertion and removal direction of the connection pin. Japanese unexamined patent publication No. H8-149770 also proposes a pair of junction tongues for absorbing stress if galling force occurs in the gripping portion. Japanese unexamined patent publication No. 2001-332159 proposes a bump for preventing the socket terminal from opening near the slit opening of the socket terminal.

However, in the starter disclosed in Japanese unexamined patent publication No. H6-38467, in order to maintain the OFF state of bimetal 218 by resistance 214, as compared with the circuit configuration in FIG. 27 (A), the power consumption is reduced to ⅓. Since the positive characteristic thermistor in Japanese unexamined utility model publication No. S56-38276 is divided into two sections, the power consumption can be reduced by half.

Similar to the power consumption in the starter of Japanese unexamined patent publication No. H6-38467 (the thermal capacity is large in resistance 214 for maintaining the OFF state of bimetal 218), the single-phase induction motor could not be re-started quickly. Since the positive characteristic thermistor is divided into two sections in Japanese unexamined utility model publication No. S56-38276, the re-starting time could be decreased only to half.

The invention is devised to solve the problems of the prior art; to present a starter for a single-phase induction motor capable of saving energy by substantially reducing consumption of power during stationary operation by using the positive characteristic thermistor.

The tubular socket terminal disclosed in Japanese unexamined patent publication No. H8-149770 is likely to be deformed by the stress on the arc portion divided by a groove. The socket terminal, with the junction tongues of Japanese unexamined patent publication No. H8-149770, has the junction tongues projecting sideways, problematically taking up too much space in the limited storage area of the starter. The socket in Japanese unexamined patent publication No. 2001-332159 has a bump formed separately from the socket terminal. Additionally, this also takes up much space and is hard to store in the starter.

The aforesaid invention is designed to solve these problems, and effect a starter of high reliability and long durability.

DISCLOSURE OF THE INVENTION

In order to achieve the above objects, according to embodiment 1, a starter of single-phase induction motor with the main winding and auxiliary winding, energized by an alternating-current power source, comprising:

a casing, a positive characteristic thermistor connected in series to the auxiliary winding, an auxiliary positive characteristic thermistor connected parallel to the positive characteristic thermistor and a snap action bimetal, the snap action bimetal connected in series to a series circuit of auxiliary winding and positive characteristic thermistor for sensing the heat from the auxiliary positive characteristic thermistor and turning off when reaching a set temperature, and an enclosed compartment accommodated in the casing, for enclosing the snap action bimetal and auxiliary positive characteristic thermistor.

In order to achieve the above objects, according to embodiment 5, a starter of single-phase induction motor with main winding and auxiliary winding energized by alternating-current power source, comprising:

a casing, a positive characteristic thermistor connected in series to the auxiliary winding, an auxiliary positive characteristic thermistor connected parallel to the positive characteristic thermistor and a snap action bimetal, the bimetal connected in series to a series circuit of auxiliary winding and positive characteristic thermistor for sensing the heat from the auxiliary positive characteristic thermistor and turning off when reaching a set temperature, an enclosed compartment accommodated in the casing, for enclosing the bimetal and auxiliary positive characteristic thermistor, and a magnet for applying magnetic force to the bimetal so as to force the contact point to the ON side.

According to embodiment 7, a starter of single-phase induction motor having main winding and auxiliary winding energized by alternating-current power source, comprising:

a casing, a positive characteristic thermistor connected in series to the auxiliary winding, an auxiliary positive characteristic thermistor connected parallel to the positive characteristic thermistor and a snap action bimetal, a temperature sensing magnet for sensing the heat from the auxiliary positive characteristic thermistor and demagnetizing when reaching a set temperature, a switch connected in series to a series circuit of auxiliary winding and positive characteristic thermistor, and turning on as being attracted by the magnetic force of the temperature sensing magnet, and turning off by demagnetization of the temperature sensing magnet, and an enclosed compartment accommodated in the casing, for enclosing the switch.

According to embodiment 8, a starter of single-phase induction motor having main winding and auxiliary winding energized by alternating-current power source, comprising:

a positive characteristic thermistor connected in series to the auxiliary winding, an auxiliary positive characteristic thermistor connected parallel to the positive characteristic thermistor and a snap action bimetal, a temperature sensing magnet for sensing the heat from the auxiliary positive characteristic thermistor and demagnetizing when reaching a set temperature, and a reed switch connected in series to a series circuit of auxiliary winding and positive characteristic thermistor, and turning on as being attracted by the magnetic force of the temperature sensing magnet, and turning off by demagnetization of the temperature sensing magnet.

In the starter for a single-phase induction motor, as set forth in embodiment 1 of the invention, when starting up, since the positive characteristic thermistor is low in resistance, a starting current flows through the auxiliary winding by way of a series circuit of positive characteristic thermistor and the snap action bimetal. As a result, the single-phase induction motor starts up. By flow of starting current, the positive characteristic thermistor generates heat by itself, becomes high in resistance, and more current flows into the auxiliary positive characteristic thermistor side that is connected parallel to the positive characteristic thermistor. When the auxiliary positive characteristic thermistor reaches a set temperature, the snap action bimetal is cut off, and no current flows into the positive characteristic thermistor. Subsequently, the single-phase induction motor starts up completely and gets into stationary operation.

When the snap action bimetal is cut off, current flows only into the auxiliary positive characteristic thermistor side to generate heat; this heat keeps the snap action bimetal in the OFF state.

Therefore, during stationary operation of the single-phase induction motor, no current flows into the positive characteristic thermistor. Instead, current flows into the auxiliary positive characteristic thermistor side, albeit this current is very small and only enough to generate heat in the auxiliary positive characteristic thermistor for maintaining the OFF state of the snap action bimetal. Power consumption by the auxiliary positive characteristic thermistor is significantly less than the power consumption by the conventional positive characteristic thermistor.

Beneficially, since the snap action bimetal and auxiliary positive characteristic thermistor are contained in the same enclosed compartment in the casing, heat hardly radiates outside, and the OFF state of the snap action bimetal can be maintained by very small power consumption. The flammable gas (hydrocarbon compound such as butane) refrigerant of the enclosed compressor is used, and in the event that refrigerant leaks, it is contained within the enclosed compartment, ergo: ignition by spark in opening and closing action of snap action bimetal is prevented.

Additionally, during stationary operation of single-phase induction motor, the positive characteristic thermistor is cooled due to operating in a large thermal capacity—temperature is ordinary. On the other hand, since the auxiliary positive characteristic thermistor is small in thermal capacity, it is quick to cool. Therefore, when attempting to start up again (immediately after stopping the single-phase induction motor), the auxiliary positive characteristic thermistor is immediately cooled to nearly ordinary temperature. It is ready to start up very quickly: several seconds to dozens of seconds, and it is possible to re-start quickly without repetition of operation and reset of overload relay as in the prior art.

Moreover, a small-sized auxiliary positive characteristic thermistor is used for heating the bimetal; it is effective for correcting changes in response to ambient temperature without the disadvantages of voltage fluctuations.

Referring to embodiment 2, the starter of single-phase induction motor is outlined: the snap action bimetal is composed of a movable contact plate for oscillating, a movable contact point, a bimetal, and a plate spring of semicircular section. The plate spring is interposed between the first support point of the movable contact plate, and the second support point of the bimetal.

The movable contact plate is forced to cause the plate spring to push the movable contact point to the fixed contact point side. The second support point is shifted to the leading end position side at low temperature of the bimetal, and the movable contact plate is forced so as to cause the plate spring to depart the movable contact point (from the fixed contact point side) when the second support point is shifted to the leading end position side, at high temperature of the bimetal. As a result, the snap action bimetal can cut off the contact quickly and the arc does not continue; the rough contact or noise does not occur during connection time after contact pressure becomes zero. The contact is not opened or closed by vibration; hence, the connection reliability of contact is high and durable.

In embodiment 3, the starter of the single-phase induction motor: the snap action bimetal is a bimetal processed by drawing. In embodiment 4, the starter of the single-phase induction motor: the snap action bimetal is a bimetal processed by forming in a circular form in the center. Accordingly, the snap action bimetal can cut off the contact quickly and the arc does not continue; the rough contact or noise does not occur during connection time after contact pressure becomes zero. The contact is not opened or closed by vibration; hence, the connection reliability of contact is high and durable.

In embodiment 5, the bimetal contacting the free end side is forced to the contact the ON side by the magnetic force of the magnet. When the bimetal is cut off, the magnetic force from the magnet is lowered inversely proportional to the square of the distance. The bimetal receives the strongest magnetic force in contact ON state, and after the contact leaves, the magnetic force decreases rapidly, so that the contact can be cut off quickly. Therefore, the arc does not continue, and the rough contact or noise does not occur. Connection time after contact pressure becomes zero, and the contact is not opened or closed by vibration. Hence, the connection reliability of contact is high, and durable.

In embodiment 6, an auxiliary positive characteristic thermistor contacts with the base of the bimetal. Hence, heat from the auxiliary positive characteristic thermistor can be efficiently transmitted to the bimetal, and the OFF state of the bimetal can be maintained by the auxiliary positive characteristic thermistor of small power consumption.

In embodiment 7, for example, a switch having a contact at the free end side of the spring plate (made of magnetic conductive member) senses heat from the auxiliary positive characteristic thermistor. When the temperature rises to the set temperature, it has a force enacted on it by the temperature sensing magnet which is demagnetized. That is, at less than the set temperature, the switch resists the elastic force of the spring plate, and is attracted by the magnetic force of temperature sensing magnet. This turns it on, and when exceeding the set temperature, the switch is turned off by the elastic force of the spring plate by demagnetization of the temperature sensing magnet. At this time of turning off, the magnetic force from the temperature sensing magnet drops inversely proportional to the square of the distance. The switch has the strongest magnetic force in contact ON state, and after the contact leaves, the magnetic force drops rapidly, so that the contact can be cut off quickly. Therefore, the arc does not continue, and the rough contact or noise does not occur. Connection time after contact pressure becomes zero, and the contact is not opened or closed by vibration. Hence the connection reliability of contact is high, and durable.

In embodiment 8, a reed switch senses the heat from the auxiliary positive characteristic thermistor, it is turned on or off by the magnetic force of temperature sensing magnet which is demagnetized when reaching the set temperature. At lower than the set temperature, the reed switch is turned on by the magnetic force of temperature sensing magnet, and when exceeding the set temperature, the reed switch is turned off by demagnetization of the temperature sensing magnet. At this time of turning off, the magnetic force from the temperature sensing magnet drops inversely proportional to the square of the distance, and the reed switch is cut off quickly. Therefore, the arc does not continue, and the rough contact or noise does not occur. Connection time after contact pressure becoming zero is short, and the contact is not opened or closed by vibration. Hence the connection reliability of contact is high, and it is free from defect for a long period of time.

In embodiment 9, the starter of the single-phase induction motor: a through-hole is pierced in a specified position of a conductor plate having a spring member for connecting electrically while holding the positive characteristic thermistor by elastic force, and a fuse is provided by narrowing the width in the outer circumference of the through-hole. Hence, in the event of abnormal heat generation of positive characteristic thermistor, thermal runaway, or elevation of resistance to cause nearly short-circuited state to increase current, the fuse melts down. Hence, burning the starting winding or starting relay can be prevented.

In embodiment 10, slots are provided in the contacting corners bent at obtuse angles for contacting with the positive characteristic thermistor in the spring section for holding the positive characteristic thermistor. As a result, contact points with the positive characteristic thermistor of contacting corners are divided and doubled in number, so that the contact reliability can be enhanced.

In embodiment 11, notches are provided in the contacting corners bent at obtuse angles for contact with the positive characteristic thermistor in the spring section which holds the positive characteristic thermistor. As a result, contact points with the positive characteristic thermistor of contacting corners are divided and doubled in number, enhancing the contact reliability. Further, the resonance frequency of contacting corners is different between the inside and outside of the notch. Compressor vibration is transmitted to the starter, the positive characteristic thermistor, and spring member resonance. If the positive characteristic thermistor electrode is hit by the spring member, the electrode may damaged or separated, but in embodiment 11 (since the resonance frequency is different between the inside and outside of contacting corners) they do not resonate at the same time. Thus, the contacting corners will not hit the positive characteristic thermistor, and electrodes of the positive characteristic thermistor will not be damaged.

In order to achieve the above objects, according to embodiment 12, a starter of single-phase induction motor with the main winding and the auxiliary winding comprises the positive characteristic thermistor that is connected in series to the auxiliary winding, and a socket terminal for connecting electrically with a detachable connection pin. The socket terminal has a pair of plates extending sideways in the axial direction of the connection pin, bent to the inner side, with the leading end formed in an arc shape so as to conform to the columnar shape of the connection pin. It is provided with a connection pin holder with the leading ends spaced from each other; the connection pin holder is divided into two sections by the slit in the connection pin: the axial direction and vertical direction—into the leading end side in the first position, and inner side in second position.

In the starter of embodiment 12, the connection pin holder of the socket terminal is divided into two sections (first portion at leading end side and second portion at inner side) and if galling force acts when inserting the connection pin, spreading is limited to the first portion at leading end side and spreading is not extended to the second portion at inner side. Moreover, in the second portion, fatigue is prevented, and favorable contact state with the connection pin is maintained, disallowing damage caused by heating of the contact portion.

Further, when inserting into the connection pin, the first portion at the leading end side is spread and inserted, and when the connection pin leading end reaches the second portion, the second portion begins to spread. That is, the force required for inserting is strongest at the beginning and then remains nearly unchanged in order to push open the portion narrower than the connection pin. But in the invention, it is enough to push open only the first portion at the leading end side, being divided, at the initial time of inserting the connection pin, as compared with the conventional product required to push open the entire connection pin holder. Thus, the inserting process is easier. Since the size is the same as in the conventional product, the space efficiency is high, and it is easy to apply in the existing starter.

If there is inclination between the connection pin and socket terminal (since the first portion at the leading end and the second portion at the inner side independently contact with the connection pin), the connection pin and socket terminal contact each other point to point. The contact point is thus doubled in number, and the electric connection of connection pin and the socket terminal can be assured.

In embodiment 13, the recess of accommodating the leading end of the connection pin, penetrating through the connection pin holder, is provided in the casing; the chamfered portion of the leading end of the connection pin penetrates through the connection pin holder and is positioned in the recess. That is, since the chamfered portion is not held by the connection pin holder, the gripping force of the connection pin by the connection pin holder can be enhanced, effectively lowering the contact resistance.

In embodiment 14, since the first portion at the leading end side of the connection pin holder is formed wider to hold the connection pin more moderately than the inner side second portion, only a small effort is needed when inserting to insert the connection pin. On the other hand, the inner side second portion is formed narrowly, and a favorable contact state with the connection pin can be held at the second portion; this effectively bypasses damage caused by potential heat in the contact portion, in which case, does not occur.

In embodiment 15, since the length of the connection pin holder in the connection pin axial direction of the first portion at leading end is formed longer than the inner side second portion, the galling force (upon inserting the connection pin) is held in the first portion, arresting spreading of galling to the second portion. As a result, favorable contact state with the connection pin can be maintained in the second portion. This effectively bypasses damage caused by potential heat in the connection portion, in which case, does not occur.

In embodiment 16, the length of the connection pin holder in the connection pin axial direction of the second portion at the inner side, is formed longer than the leading end first portion at the inner side. This firmly holds the connection pin at the second portion, fatigue is prevented, and favorable contact state with the connection pin is maintained. This effectively bypasses damage caused by potential heat in the connection portion, in which case, does not occur.

In embodiment 17, a V-notch is provided at the leading end of the second portion at the inner side of the connection pin holder (when inserting into the connection pin). If the connection pin leading end reaches the second portion after inserting into the first portion of the leading end side, it can be easily inserted into the second portion side, and the insertion work is easy.

In order to achieve the above objects, according to embodiment 19, a starter of the single-phase induction motor with main winding and auxiliary winding energized by alternating-current power source, comprising:

a casing, a positive characteristic thermistor connected in series to the auxiliary winding, an auxiliary positive characteristic thermistor connected parallel to the positive characteristic thermistor and a snap action bimetal, a slow action bimetal connected in series to a series circuit of auxiliary winding and positive characteristic thermistor for sensing the heat from the auxiliary positive characteristic thermistor and turning off when reaching a set temperature, and an enclosed compartment accommodated in the casing, for enclosing the slow action bimetal and auxiliary positive characteristic thermistor.

In the starter of the single-phase induction motor, as set forth in embodiment 19, when starting up the single-phase induction motor, the positive characteristic thermistor is low in resistance. A starting current flows through the auxiliary winding by way of series circuit of the positive characteristic thermistor and the slow action bimetal; thus, the single-phase induction motor is started up. When the starting current flows, the positive characteristic thermistor generates heat by itself and becomes high in resistance. More current flows into the auxiliary positive characteristic thermistor side connected parallel to the positive characteristic thermistor. When the auxiliary positive characteristic thermistor reaches a set temperature, the slow action bimetal is cut off, and no current flows into the positive characteristic thermistor. The single-phase induction motor subsequently starts up completely and gets into stationary operation.

When the slow action bimetal is cut off, current flows only into the auxiliary positive characteristic thermistor side to generate heat. By this heat generation, the slow action bimetal is kept in OFF state.

Therefore, during stationary operation of the single-phase induction motor, no current flows into the positive characteristic thermistor. Instead, current flows into the auxiliary positive characteristic thermistor side, though the current flowing in the auxiliary positive characteristic thermistor is very small. It is only enough current to generate heat in the auxiliary positive characteristic thermistor for holding the OFF state of the slow action bimetal, and the power consumption by the auxiliary positive characteristic thermistor is much smaller than the power consumption by the conventional positive characteristic thermistor.

In particular, since the slow action bimetal and the auxiliary positive characteristic thermistor are contained in the same enclosed compartment in the casing, heat hardly radiates outside, and the OFF state of the slow action bimetal can be maintained by very little power consumption. Further, the refrigerant of enclosed compressor—flammable gas (hydrocarbon compound such as butane)—is used. In the case that the refrigerant leaks, it is contained within the enclosed compartment, preventing ignition by spark in the opening and closing action of the slow action bimetal.

Further, since the slow action bimetal is used, as compared with the formed snap action bimetal, it withstands use for a longer period of time.

Further, during stationary operation of the single-phase induction motor, the positive characteristic thermistor (starting in large thermal capacity) is cooled, and temperature is ordinary. On the other hand, since the auxiliary positive characteristic thermistor is small in thermal capacity, it is quick to cool. Therefore, when attempting to start up again right after stopping the single-phase induction motor, the auxiliary positive characteristic thermistor is immediately cooled nearly to ordinary temperature. It is ready to start up very quickly in several seconds to dozens of seconds, and it is possible to re-start quickly without repetition of operation and reset of overload relay as in the prior art.

In embodiment 20, an auxiliary positive characteristic thermistor contacts with the base of the slow action bimetal. Hence, the heat from the auxiliary positive characteristic thermistor can be efficiently transmitted to the slow action bimetal. The OFF state of the slow action bimetal can be maintained by the auxiliary positive characteristic thermistor with little power consumption.

In order to achieve the above objects, according to embodiment 21, a starter of single-phase induction motor having main winding and auxiliary winding energized by alternating-current power source, comprising:

a positive characteristic thermistor connected in series to the auxiliary winding, an auxiliary positive characteristic thermistor connected parallel to the positive characteristic thermistor and a snap action bimetal, a slow action bimetal connected in series to a series circuit of auxiliary winding and positive characteristic thermistor for sensing the heat from the auxiliary positive characteristic thermistor and turning off when reaching a set temperature, and the snap action bimetal connected in series to a series circuit of auxiliary winding, positive characteristic thermistor, and slow action bimetal for sensing the heat from the positive characteristic thermistor and turning off when reaching a specified high temperature.

The starter of the single-phase induction motor (as set forth in embodiment 21) when starting up the single-phase induction motor, the positive characteristic thermistor is low in resistance, and a starting current flows through the auxiliary winding by way of series circuit of the positive characteristic thermistor and slow action bimetal; the single-phase induction motor is started up. When the starting current flows, the positive characteristic thermistor generates heat by itself, and becomes high in resistance, and more current flows into the auxiliary positive characteristic thermistor side connected parallel to the positive characteristic thermistor. When the auxiliary positive characteristic thermistor reaches a set temperature, the slow action bimetal is cut off, and no current flows into the positive characteristic thermistor. The single-phase induction motor completes starting-up and gets into stationary operation.

When the slow action bimetal is cut off, current flows only into the auxiliary positive characteristic thermistor side to generate heat. By this heat generation, the slow action bimetal is kept in OFF state.

Therefore, during stationary operation of single-phase induction motor, no current flows into the positive characteristic thermistor. Instead, the current flows into the auxiliary positive characteristic thermistor side, though the said current (flowing in the auxiliary positive characteristic thermistor) is very small, and only enough to generate heat in the auxiliary positive characteristic thermistor. This current holds the OFF state of the slow action bimetal, and power consumption by the auxiliary positive characteristic thermistor is much smaller than the power consumption by the conventional positive characteristic thermistor. Further, since the slow action bimetal is used, as compared with the formed snap action bimetal, it withstands use for a longer period of time.

When the positive characteristic thermistor generates heat abnormally and reaches given high temperature, the snap action bimetal is cut off, and current to the auxiliary winding is cut off. The positive characteristic thermistor is thus prevented from running away thermally, (becoming high in temperature and low in resistance), and breaking down insulation by flow of excessive current through the auxiliary winding.

In embodiment 22, the snap action bimetal is set so that it may not reset at ordinary temperature. Hence, thermal runaway of the positive characteristic thermistor is reset by the snap action bimetal can be prevented completely.

In embodiment 23, the starter of the single-phase induction motor: the contact point of the slow action bimetal and contact point of the snap action bimetal directly contact with each other. The slow action bimetal reaches the set temperature and it departs from the contact point at the snap action bimetal side (when the snap action bimetal reaches the specified high temperature), it departs from the slow action bimetal side. When the slow action bimetal is cut off by an application of heat, heat is also applied to the snap action bimetal side, and the snap action bimetal slightly moves to the side, departing from the slow action bimetal side. Through using a slow action bimetal (slow in action though long in life), the starting current can be cut off appropriately. That is, along with temperature rise, both bimetals move in a mutually departing direction, and chattering hardly occurs. Further, since both contacts are made of movable contacts, wiping (rubbing) phenomenon always occurs by temperature changes. The contact contacting portions are cleaned, and a long life is realized by using silver contact without gold plating. Further, since the contact points of the slow action bimetal and contact points of snap action bimetal directly contact with each other, lower cost and lower resistance are realized, as compared with the case of interposing terminal members of metal plates or the like that provide fixed contacts at both sides.

In embodiment 24, a stopper is provided to contact with the leading end of the snap action bimetal, so as not to interrupt the operation of the slow action bimetal. It is hence possible to prevent warping the slow action bimetal side if the snap action bimetal returns to ordinary temperature due to cooling of positive characteristic thermistor after completion of starting."

BRIEF DESCRIPTION OF THE DRAWINGS

FIG. 1 (A) is an explanatory diagram showing mounting of starter and overload relay on compressor in the first embodiment, FIG. 1 (B) is a perspective view of pin terminal.

FIG. 2 is a circuit diagram of starter and overload relay in the first embodiment.

FIG. 3 is a plan view of starter and overload relay in the first embodiment.

FIG. 4 (A), FIG. 4 (B) are X-X longitudinal sectional views of cover mounting state of overload relay shown in FIG. 3, specifically FIG. 4 (A) showing a state before inversion of bimetal, FIG. 4 (B) showing a state after inversion of bimetal.

FIG. 6 (A) is a plan view from arrow e-side of FIG. 5 (B), FIG. 6 (B) is a side view from arrow f-side in FIG. 5 (C), and FIG. 6 (C) is a bottom view from arrow g-side in FIG. 5 (B).

FIG. 7 (A) is a plan view of assembled state of overload relay in starter, FIG. 7 (B) is a side view, and FIG. 7 (C) is a bottom view.

FIG. 8 (A) is a plan view of the snap action bimetal, and FIG. 8 (B), FIG. 8 (C) are magnified sectional views of starter shown in FIG. 5 (C).

FIG. 9 (A) is a magnified view of first connection plate shown in FIG. 5 (A), FIG. 9 (B) is an arrow h-view of FIG. 9 (A), FIG. 9 (C) is an arrow j-view of FIG. 9 (A), and FIG. 9 (D) is a magnified perspective view of abutting portion with main PTC surrounded by circle D in FIG. 9 (C).

FIG. 10 (A) is a plan view of snap action bimetal in a modified example of the first embodiment, and FIG. 10 (B) and FIG. 10 (C) are sectional views of starter in the modified example of the first embodiment.

FIG. 12 (A) is a plan view of the snap action bimetal of starter in the second embodiment, FIG. 12 (B) is a side view, FIG. 12 (C) is a plan view of the snap action bimetal of starter in other example of the second embodiment, FIG. 12 (D) is a side view of other example, and FIG. 12 (E) and FIG. 12 (F) are explanatory diagrams of operation of the snap action bimetal of the second embodiment.

FIG. 13 (A) is a plan view of the snap action bimetal of starter in a modified example of the second embodiment, FIG. 13 (B) is a side view, and FIG. 13 (C) and FIG. 13 (D) are explanatory diagrams of operation of the snap action bimetal in the modified example of the second embodiment.

FIG. 14 (A) and FIG. 14 (B) are explanatory diagrams of operation of bimetal of starter in the third embodiment.

FIG. 15 (A) and FIG. 15 (B) are explanatory diagrams of operation of switch of starter in the fourth embodiment.

FIG. 18 (A) is a magnified perspective view of abutting portion surrounded by circle E in FIG. 5 (B), FIG. 18 (B) is a sectional view B3-B3 in FIG. 18 (A), FIG. 18 (C) is a sectional view C3-C3 in FIG. 18 (A) (with the inner side from the pin center being cut off), and FIG. 18 (D) is a perspective view of the socket terminal of the pin inserted state.

FIG. 24 (A) and FIG. 24 (B) are side views of the starter in the sixth embodiment.

FIG. 27 (A) is a circuit diagram of starter in prior art, and FIG. 27 (B) is a circuit diagram of starter disclosed in prior art Japanese unexamined patent publication No. H6-38467.

FIG. 28 (A) is a plan view of the socket terminal, FIG. 28 (B) is a sectional view, FIG. 28 (C) is a bottom view, FIG. 28 (D) and FIG. 28 (E) are sectional views showing connection pin inserted state into the starter, and FIG. 28 (F) and FIG. 28 (G) are perspective view showing the connection pin inserted state into the socket terminal.

BEST MODE FOR CARRYING OUT THE INVENTION

First Embodiment

Figure 5:
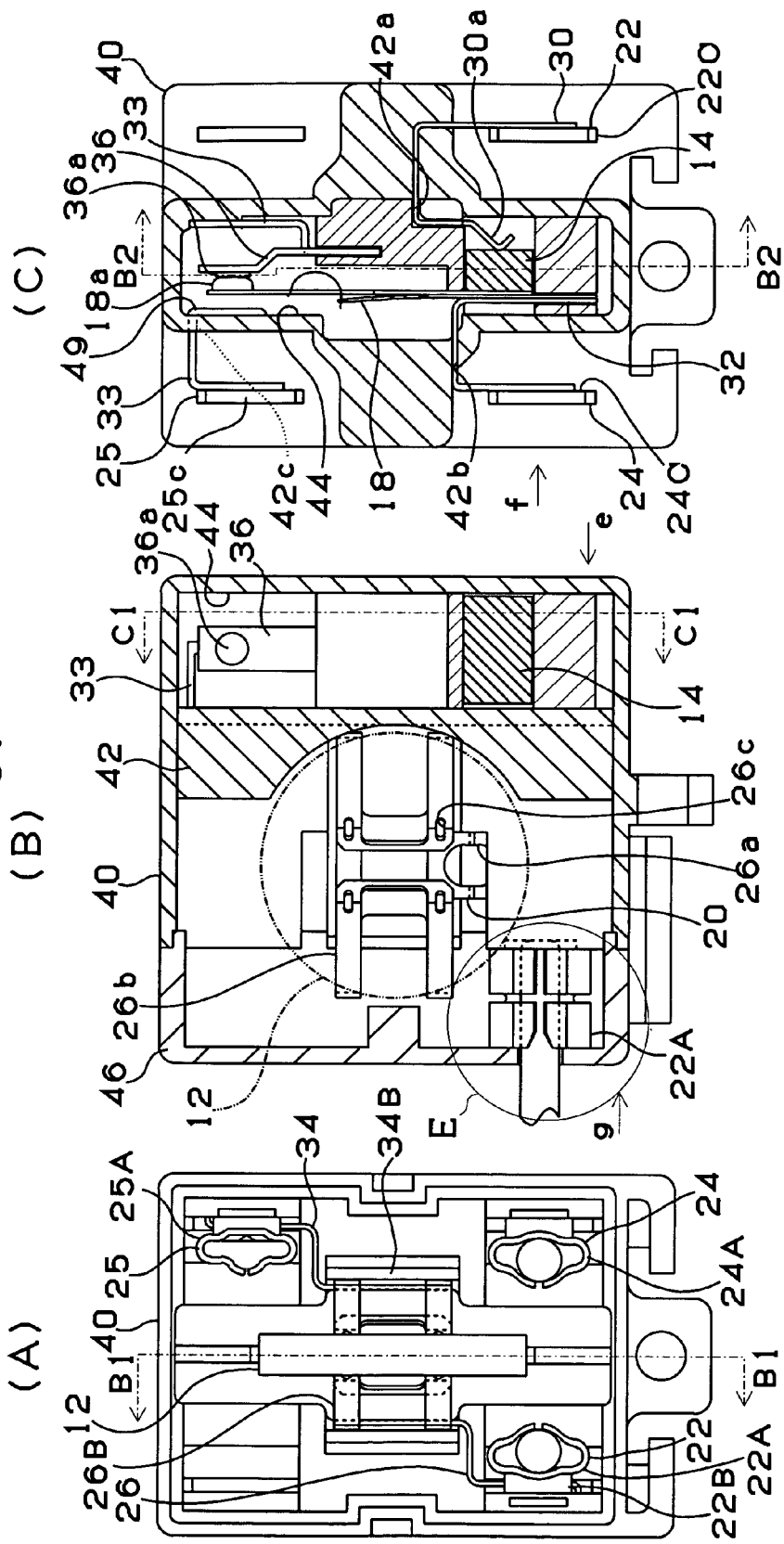
FIG. 5 (A) is a bottom view removing bottom cover of starter of single-phase induction motor of the first embodiment of the invention, FIG. 5 (B) is a sectional view of B1-B1 in FIG. 5 (A), and FIG. 5 (C) is a sectional view of C1-C1 in FIG. 5 (B).

Referring to the drawings, the starter and overload relay of the first embodiment of the invention are explained below:

As shown in FIG. 1 (A), starter 10 and overload relay 50 of the first embodiment are integrally attached to pin terminal 110 of dome 104 of compressor 102, and protected with cover 106. Motor 100 is accommodated in the compressor 102.

FIG. 2 is a circuit diagram of the starter and overload relay 50 of the single-phase induction motor in the first embodiment. Power source terminals 92 and 94 are connected to 100 V single-phase alternating-current power source 90, and one power source terminal 92 is connected to power line 96 in series to operation switch 97, overload relay 50, and other power source terminal 94 is connected to power line 98. Overload relay 50 comprises bimetal 70 and heater 76 for heating bimetal 70, and when the single-phase induction motor 100 is overloaded, heater 76 heats-up and the bimetal 70 cuts off the current. When the temperature is lowered to an ordinary temperature by an interruption of the current, bimetal 70 resets automatically, and the current flow is resumed.

The Single-phase induction motor 100 includes the main winding M and the auxiliary winding S. The main winding M is connected between power lines 96 and 98, and one terminal of auxiliary winding S is connected to power line 96. The single-phase induction motor 100 is designed to drive the enclosed compressor 102, for example, by referring to the refrigeration cycle in the refrigerator as shown in FIG. 1. Operation switch 97 is turned on or off by the temperature control device not shown in the diagram. It is turned on when the refrigerator compartment temperature reaches an upper limit, and is turned off when lowered to lower limit temperature.

The other terminal of the auxiliary winding S is connected to the power line 98 by way of a series circuit of the positive characteristic thermistor (main PTC) 12 and normally-closed snap action bimetal 18. Parallel to main PTC 12 and snap action bimetal 18, the auxiliary positive characteristic thermistor (auxiliary PTC) 14 is connected. The Main PTC 12 and auxiliary PTC 14 are composed, for example, of oxide semiconductor ceramic mainly made of barium titanate. In titanate material, the electrical resistance substantially increases when the temperature goes higher than the curie temperature. For example, the positive characteristic thermistor 12 is about 5 ohms at ordinary temperature (around 25 deg. C.), about 0.1 kohm at 120 deg. C., and about 1 to 10 kohms at 140 deg. C. Auxiliary PTC 14 has higher resistance values than main PTC 12, and the thermal capacity is set at about ⅓ to 1/10 (optimally about ⅙), so that the power consumption may be ⅓ to 1/10 of main PTC 12. The snap action bimetal 18 senses the generated heat of auxiliary PTC 14, and is turned on or off. For example, it is designed to be turned off when the detected heat reaches the set temperature of 140 deg. C.

The operation of the starter 10 in the first embodiment is explained: when the operation switch 97 is turned on, a starting current flows through the main winding M by way of the operation switch 97 and the overload relay 50. The main PTC 12 is low in resistance (for example, about 5 ohms) at ordinary temperature, and the starting current flows in the series circuit of the auxiliary winding S, the main PTC 12, the snap action bimetal 18, and parallel circuit of auxiliary PTC 14. The result is the start-up of the single-phase induction motor 100.

When the starting current of auxiliary winding S flows into the main PTC 12, the main PTC 12 and auxiliary PTC 14 generate heat, and the electrical resistance increases rapidly. Several seconds later, the main PTC 12 and the auxiliary PTC 14 reach the temperature of 140 deg. C., and the electrical resistance of the main PTC 12 at this time increases to, for example, 1 to 10 kohms. Subsequently, the current flowing in the snap action bimetal 18 decreases. When the auxiliary PTC 14 reaches the temperature of 140 deg. C., the snap action bimetal 18 is turned off, and no current flows into the series circuit of the main PTC 12 and the snap action bimetal 18, thereby starting the single-phase induction motor 100 up completely into stationary operation.

When the snap action bimetal 18 is turned off, current flows only into the auxiliary PTC 14 side, and heat is generated at auxiliary PTC 14 side, thus keeping the snap action bimetal 18 in the OFF state.

Therefore, during stationary operation of the single-phase induction motor 100, no current flows into the main PTC 12, instead, current flows into the auxiliary PTC 14 side. However, the current flowing in the auxiliary PTC 14 side is only small enough to generate heat insofar as to keep the OFF state of the snap action bimetal 18. As a result, the power consumption by auxiliary PTC 14 is extremely small compared with the power consumption by the conventional positive characteristic thermistor.

During stationary operation of the single-phase induction motor 100, the main PTC 12 of large thermal capacity is cooled to ordinary temperature. On the other hand, the auxiliary PTC 14 is small in thermal capacity it is quick to cool. Therefore, if attempting to start again immediately after stopping the single-phase induction motor 100, auxiliary PTC 14 is quickly cooled nearly to ordinary temperature, and it is ready to restart in about several seconds to dozens of seconds. It is able to be started quickly without repeating operation and reset of overload relay as in the prior art.

Continuously, the mechanical structure of the overload relay 50 in the first embodiment is explained by referring to FIG. 3 and FIG. 4.

FIG. 3 is a plan view of overload relay 50 with the cover removed. FIG. 4 is a section view X-X in FIG. 3, with the cover attached. As shown in FIG. 4, the overload relay 50 comprises base 52 made of unsaturated polyester, and cover 54 of PBT resin. On the top of the overload relay 50, the socket terminal 58 is disposed for inserting a pin (not shown) extending from the motor side, and the tab terminal 56, as shown in FIG. 3, is disposed at the side surface extending sideways for inserting the power source side receptacle.

The overload relay 50 is composed as shown in FIG. 4 (A), in which the bimetal 70 is held between the movable contact plate 60 and the movable side terminal 74, and heater 76 is disposed beneath the bimetal 70. The movable contact plate 60 is disposed above the bimetal 70. One end of the movable contact plate 60 is welded and fixed to the reinforcing plate 78, and the movable contact 62 contacts the fixed contact 64 which is attached to the free end.

The mechanical structure of the overload relay 50 is more specifically described below:

The tab terminal 56, connected to the power source side receptacle, is formed as a flat plate as shown in FIG. 3, and the connection plate 72, formed in a crank shape, is spot-welded to tab terminal 56, and is connected to terminal 76a of the heater 76 by way of the connection plate 72. The Heater 76 is formed, for example, of Ni-Chrome, or iron chrome wire wound in a coil form, and is accommodated in recess 52c (see FIG. 4 (A)) formed in base 52. As shown in FIG. 3, the other end 76b of the heater 76 is connected to the reinforcing plate 78 by way of movable side terminal 74. As shown FIG. 4 (A), reinforcing plate 78 is welded to the movable the side terminal 74, penetrating through the hole in movable contact plate 60 and recess in the bimetal 70.

The bimetal 70 comprises rectangular snap 70a, and a pair of holders 70b, 70b for the holding snap 70a, and the snap 70a is formed same as the flat bimetal: inverted in curvature (concave and convex relation) at a specified temperature. As shown in FIG. 4 (A), the bimetal 70 has its holders 70b enclosed and fixed between the movable contact plate 60, and the movable side terminal 74, with the snap 70a supported on a columnar support 52a formed in the base 52. Around support 52a, the heater is disposed in a coil form in recess 52c, so that the heat generated in the heater 76 is efficiently transmitted to the bimetal 70.

The bimetal 70 is fixed on holders 70b, and the snap 70a is supported on the support 52a, obtaining the desired characteristic through assembly without requiring adjustments to be made. In particular, the holders 70b are smaller than the snap 70a, if the holders 70b are fixed, the snap characteristic is the same as in the single bimetal of prior art (bimetal not fixed)—this required characteristic may be obtained easily.

On the other hand, the movable contact plate 60 is made of an elastic metal plate, has a movable contact point 62 at the free end, and a bump 60a contacting the free end 70a of the bimetal nearly in the center.

As shown in FIG. 4 (A), the movable contact 62 of the movable contact plate 60, fixed to the reinforcing plate 78, contacts the fixed contact point 64 and the fixed contact plate 66. Fixed contact point 64 has one end 66a fixed to the base 52 side as shown in FIG. 4 (A) and the other end 66b extended outside by way of a through-hole or notch (not shown) formed in cover 54. Outside the cover 54, the other end 66b of the fixed contact plate and the socket terminal 58 are connected to each other.

As shown in FIG. 4 (B), a bump 54a is formed in cover 54 of the overload relay 50, and the movable contact plate 60 is permitted to oscillate upward. The cover 54 also has the engaging portion 55 for coupling with the Starter 10.

The overload relay 50, as shown in FIG. 4 (A), supplies the current from the power source entered through tab terminal 56 to the motor M side as the movable contact point 62 and the fixed contact point 64 contact each other before the bimetal 70 is inverted (snaps).

When the overcurrent flows due to an overload of motor M or a confinement of the rotor, the heat generation in heater 76 increases, and when the bimetal 70 reaches a preset temperature (for example, 120 deg. C.), it snaps from the convex state to a concave state as shown in FIG. 4 (B). This intern pushes up the movable contact plate 60, and the contact of the movable contact point 62, cutting off the fixed contact point 64. As a result, the power supply to the motor M is stopped, and the motor is protected. By stopping the power supply to the motor M, flow of the current to the heater 76 is stopped, and the temperature of the bimetal 70 declines. Reaching a predetermined temperature and snapping from a concave state to convex state (as shown in FIG. 4 (A)), the contact of the movable contact point 62 and the fixed contact point 64 is restored by the elasticity of the movable contact plate 60. As a result, the power supply to motor M is resumed.

The mechanical structure of the starter 10 in the first embodiment is explained by referring to FIG. 5 and FIG. 6.

FIG. 5 (A) is a bottom view removing the bottom cover of the starter of the single-phase induction motor of the first embodiment of the invention, FIG. 5 (B) is a sectional view of B1-B1 in FIG. 5 (A), and FIG. 5 (C) is a sectional view of C1-C1 in FIG. 5 (B). In addition, FIG. 5 (B) corresponds to a sectional view of B2-B2 in FIG. 5 (C). FIG. 6 (A) is a plan view from arrow e side of FIG. 5 (B), FIG. 6 (B) is a side from arrow f-view in FIG. 5 (C), and FIG. 6 (C) is a bottom from arrow g-view in FIG. 5 (B). As shown in FIG. 6 (B), the starter 10 comprises casing 40 and bottom lid 46, and flange 48 is formed so as to install overload relay 50 as shown in FIG. 6, in its outside.

As shown in FIG. 5 (A), the inside of casing 40 has terminal 22 connected to auxiliary winding S side shown in FIG. 2. Terminal 22 includes integrally tab terminal 22C, socket terminal 22A, and coupler 22B for coupling them. Coupler 22B has first connection plate 26 having spring member 26B for holding main PTC 12.

As shown in FIG. 5 (C), one end of the second connection plate 30 is connected to the tab terminal 22C of terminal 22. The spring member 30a at the other end of the second connection plate 30 applies the spring pressure to the auxiliary PTC 14 and holds it. The auxiliary PTC 14 contacts the base of the snap action bimetal 18. the spring member 30a of second connection plate 30, the auxiliary PTC 14, the base of the snap action bimetal 18, and one end of third connection plate 32 contact each other adjacently. The other end of the third connection plate 32 is connected to the tab terminals 24C of terminal 24 connecting to the power line 98 side and the main winding M shown in FIG. 2 (Terminal 24 has tab terminal 24C and socket terminal 24A).

On the other hand, at the leading end side of the snap action bimetal 18, the movable contact point 18a is provided, and contacts the fixed contact point 36a of the fixed contact plate 36 formed in a crank shape. At the side wall side of casing 40 of the movable contact point 18a, a stopper 49 is provided for defining the movement of the movable contact point 18a. The other end of the fixed contact plate 36 is connected to the fourth connection plate 33, with the other end of the fourth connection plate 33 connected to terminal 25, tab terminal 25C, and socket terminal 25A. Terminal 25 is connected to the fifth connection plate 34 with the spring member 34B for holding the main PTC 12. Fifth connection plate 34 is of same member as first connection plate 26.

Snap action bimetal 18 and auxiliary PTC 14 are accommodated in enclosed compartment 44 formed by partition wall 42 provided at the inner side of casing 40. Enclosed compartment 44 has an airtight structure. Second connection plate 30 is surrounding enclosed compartment 44 by way of vent hole 42a provided in the side wall of casing 40, and third connection plate 32 by way of vent hole 42b, and fourth connection plate 33 by way of vent hole 42c.

FIG. 7 (A) is a plan view of assembled state of overload relay 50 in starter 10, FIG. 7 (B) is a side view, and FIG. 7 (C) is a bottom view. It is assembled by engaging flange 48 of starter 10 with coupler 55 of overload relay 50.

In the starter 10 in the first embodiment, since the snap action bimetal 18 and the auxiliary PTC 14 are accommodated in the enclosed compartment 44 in casing 40, heat hardly escapes outside, and the OFF state of the snap action bimetal 18 can be maintained by very small power consumption. Further, as the refrigerant of the enclosed compressor—flammable gas (hydrocarbon compound of butane or the like)—is used, in the event that the refrigerant leaks, it is contained within the enclosed compartment. This intern prevents the refrigerant from being ignited by the sparks generated from opening and closing action of the snap action bimetal 18.

Further, since the auxiliary PTC 14 directly contacts with the base of the snap action bimetal 18, the heat from auxiliary PTC 14 can be effectively transferred to the snap action bimetal 18; the OFF state of the snap action bimetal 18 can be maintained by the auxiliary PTC 14 using small power consumption.

The snap action bimetal 18 of the starter 10 in the first embodiment is more specifically described below by referring to FIG. 8.

FIG. 8 (A) is a plan view of the snap action bimetal 18, and FIG. 8 (B) and FIG. 8 (C) are magnified sectional views of the starter shown in FIG. 5 (C).

The snap action bimetal 18 comprises the movable contact plate 18b for oscillating movable contact point 18a with rectangular opening formed in the center, bimetal 18c, and semicircular plate spring 18d interposed between first support point P1 of movable contact plate 18b, and second support point P2 of the bimetal 18c. The leading end of the movable contact plate 18b is divided into two steps, and has two movable contact points 18a.

The plate spring 18d is made of a spring member or bimetal and is installed to maintain movable contact 18b. That is, as shown in FIG. 8 (B), when the second support point P2 is shifted to the leading end side of the bimetal 18c at low temperature from the line segment linking support point P3 and first support point P1 of the movable contact plate 18b, the movable contact plate is forced, pressing the plate spring 18d forcing movable contact point 18a to the side of the fixed contact point 36a. Accordingly, the snap action bimetal 18 is cut off only in the zero state of contact pressure. The contact time of the movable contact point 18a and fixed contact point 36a becomes so short that the movable contact point 18a and the fixed contact point 36a will not be opened or closed by vibration.

On the other hand, as shown in FIG. 8 (C), when the second support point P2 is shifted to the leading end side of the bimetal 18c at high temperature from the line segment linking support point P3 and the first support point P1 of the movable contact plate 18b, the movable contact plate 18b is forced so that the plate spring 18d may move the movable contact point 18a from the fixed contact point 36a side. That is, from the state shown in FIG. 8 (B), the bimetal 18C is curved upward. When the second support point P2 rides on the upper side by surpassing the line segment (dead point), the linking support point P3, and first support point P1 of the movable point plate 18b, the thrusting force of the plate spring 18d is inverted, and the snap action bimetal 18 is changed, as shown in FIG. 8 (C), from a movable contact point 18a to a fixed contact point 36a, so that the contact can be changed quickly. Therefore, an arc position does not continue, which prevents rough contacts or noise; hence, the connection reliability is high and durable.

The structure of the first connection plate 26 is more specifically described below by referring to FIG. 9. FIG. 9 (A) is a magnified view of the first connection plate 26 shown in FIG. 5 (A), FIG. 9 (B) is an arrow h-view of FIG. 9 (A), FIG. 9 (C) is an arrow j-view of FIG. 9 (A), and FIG. 9 (D) is a magnified perspective view of an abutting portion with the main PTC surrounded by circle D in FIG. 9 (C). As mentioned above, the fifth connection plate 34 is of the same member as the first connection plate 26.

The first connection plate 26 is made of a conductive spring material (such as of plated stainless steel of copper, copper alloy, or conductive metal plate). The first connection plate 26 comprises the connection portion 26A bent in a crank form as shown in FIG. 9 (A), and a pair of spring members 26B bent in U-form in a direction at right angle to the bending direction of the connection portion 26A as shown in FIG. 9 (B). The spring members 26B hold the main PTC 12 by elastic force, connecting electrically. As shown in FIG. 9(C), the spring members 26B have rectangular openings in the center of a pair of rectangular plates extending sideward. They form a pair of U-shapes facing the opening side, composed of a pair of parallel portions 26c, and a linking portion 26d adjoining parallel portions 26c (the pair of U-shapes are bent in a U-section to the inner side). Near the leading end of the parallel portion 26c, without bending or protruding so that the linking portion 26d may come to the inner side, the contacting corner 26f (abutting against the main PTC 12) is formed. As shown in FIG. 9 (B), the parallel portions 26c have a diaphragm 26e for reducing the contact surface area with casing 40 and preventing heat conduction.

A through-hole 26h is formed in the folded portion of the spring member 26B side of the connection portion 26A. In the first connection plate 26, the width of the outer circumference (fuse) 26j of the through-hole 26 is 0.5 mm or less. When the current of the starting winding S flows more than a specified time (for example, 30 seconds), it is designed to meltdown by fuse 26j of the outer circumference of the through-hole 26h. As a result, if the main PTC 12 deteriorates to generate abnormal heat and causes thermal runaway in an almost short-circuited state, the fuse 26j is melted down by the current, and the burning of starting winding S or the starter itself may be prevented. In particular, since the through-hole 26h is formed in the bent portion, the abutting folding portion has elasticity. By keeping an elastic state, re-fusion of the fused part can be prevented at the time of fuse fusion 26j.

Further, as shown in FIG. 9 (D), contacting corner 26f (bent at an obtuse angle to contact with main PTC 12 of parallel portion 26c) has a slot 26g provided parallel to the extending direction of parallel portion 26c. As a result, the contact point of the contacting corner 26f with main PTC 12 is doubled, and the entire spring member 26B contacts the main PTC 12 at four positions of contacting corner 26f, making eight total points of contact. In this way, the contact reliability may be enhanced.

Figure 19:
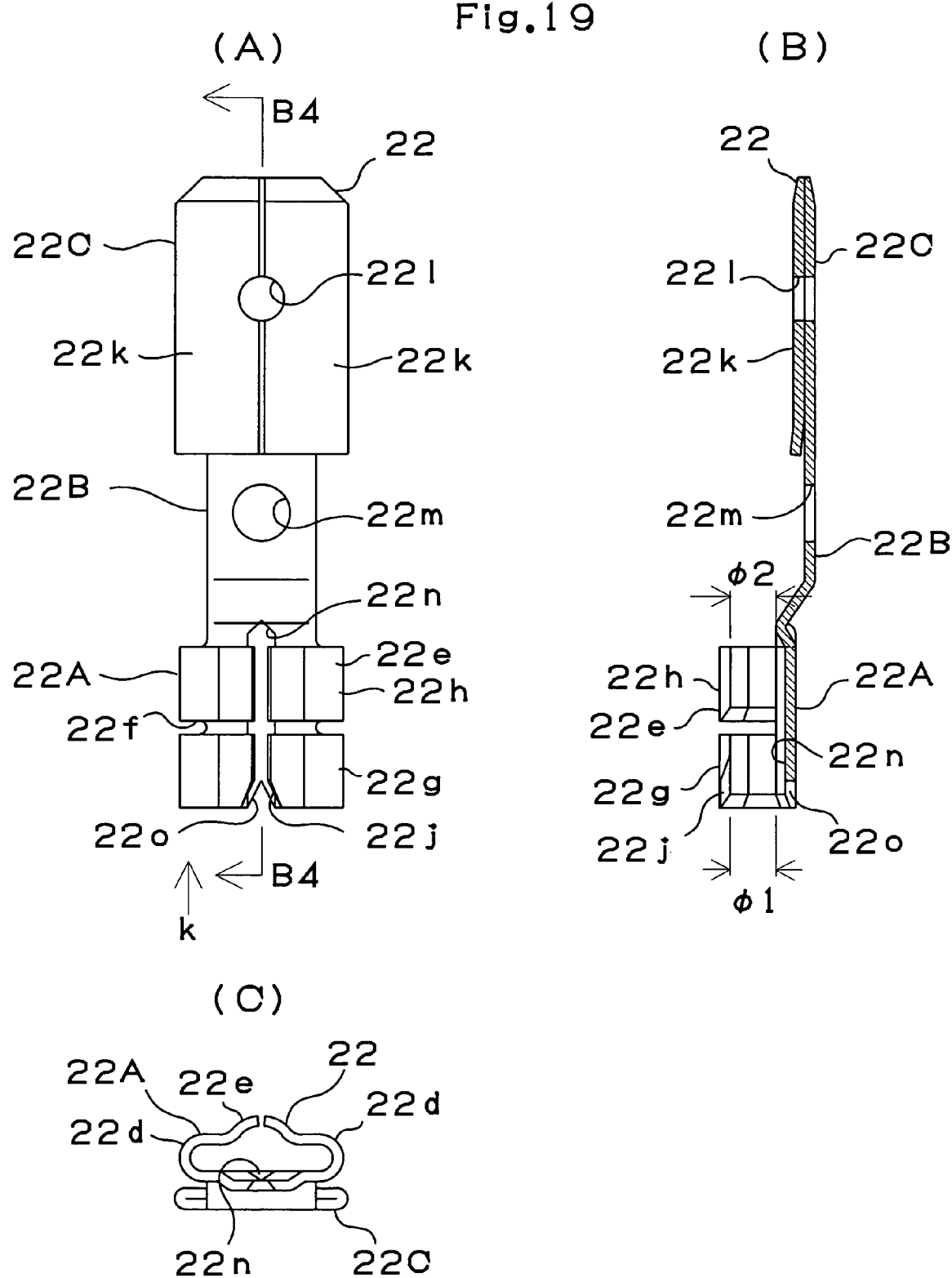
FIG. 19 (A) is a plan view of the terminal shown in FIG. 18 (A), FIG. 19 (B) is a sectional view B4-B4 in FIG. 19 (A), and FIG. 19 (C) is an arrow k-view of FIG. 19 (A).

The structure of the terminal 22 of the starter 10 is described by referring to FIG. 18 and FIG. 19.

FIG. 18 (A) is a magnified perspective view of the portion surrounded by circle E in FIG. 5 (B), FIG. 18 (B) is a sectional view B3-B3 in FIG. 18 (A), FIG. 18 (C) is a sectional view C3-C3 in FIG. 18 (A) (with the inner side from the pin center being cut off), and FIG. 18 (D) is a perspective view of socket terminal 22 of pin 116 inserted state. FIG. 19 (A) is a plan view of terminal 22 shown in FIG. 18 (A), FIG. 19 (B) is a sectional view B4-B4 in FIG. 19 (A), and FIG. 19 (C) is an arrow k-view of FIG. 19 (A).

Terminal 22 is, like the first connection plate 26, made of a conductive spring material such as plated stainless steel of copper, copper alloy, or conductive metal plate. As shown in FIG. 19 (A), terminal 22 is integrally formed of the tab terminal 22C, the socket terminal 22A, and a linking portion 22B for linking them. The tab terminal 22C plaits down a pair of plate portions 22k, extending sideways in the axial direction of the connection pin to the inner side, and forms a double structure as shown in FIG. 19 (B). A Through-hole 22l is pierced in the center of the tab terminal 22C. The linking portion 22B is formed like a crank, and the through-hole 22m is pierced in the center.

As shown in FIG. 19 (C), the socket terminal 22A folds a pair of plate portions 22d, extending sideways in the axial direction of the connection pin to the inner side. The leading ends are formed in an arc and matched with the columnar shape of the connection pin, with the leading ends separating from each other to form the connection pin holder 22e. The connection pin holder 22e is divided into two sections as shown in FIG. 19 (A), into the leading end side first position 22g and inner side second position 22h by a slit 22f in the vertical direction to the axial direction of the connection pin. At the opposite side of the connection pin holder 22e (at the lower side in FIG. 19 (C)), a V-groove 22n is formed to improve contact with the connection pin. At the leading end first position 22g, a V-notch 22j is formed. Similarly, at the leading end of V-groove 22n, V-notch 22o is also formed.

As shown in FIG. 18 (A), FIG. 18 (B), and FIG. 18 (C), recess 40a for accommodating the leading end 116a of the connection pin 116 penetrating through connection pin holder 22e is pierced in the casing 40 for the holding terminal 22.

In FIG. 18 and FIG. 19, the socket terminal 22A of the terminal 22 is explained: the socket terminal 24A of the terminal 24 and the socket terminal 58 of the overload relay 50 are also in two-section structure. The starter 10 in the first embodiment has the overload relay 50 as shown in FIG. 7, and is attached to the pin terminal 110 of the compressor 102 as shown in FIG. 1 (A). FIG. 1 (B) is a perspective view of the pin terminal 110. The pin terminal 110 has three connection pins 112, 114, 116, and the socket terminal 58 is connected to the connection pin 112. The socket terminal 24A is connected to the connection pin 114, and the socket terminal 22A is connected to the connection pin 116.

In the starter 10 and the overload relay 50 of the first embodiment, the connection pin holder 22e of the socket terminals 22A, 24A, 58 is divided into two sections, the leading end first position 22g and the inner side second position 22h. As shown in FIG. 18 (D), when galling force acts in X-direction and/or Y-direction when inserting the connection pin 116, spreading is limited to the leading end first position 22g of the connection pin holder 22e, which can not extended up to inner side second position 22h. Hence, in the second position 22h, since a favorable contact state with the connection pin is maintained, fatigue does not occur, and damage by heating of the contact portion is avoided.

Figure 22:
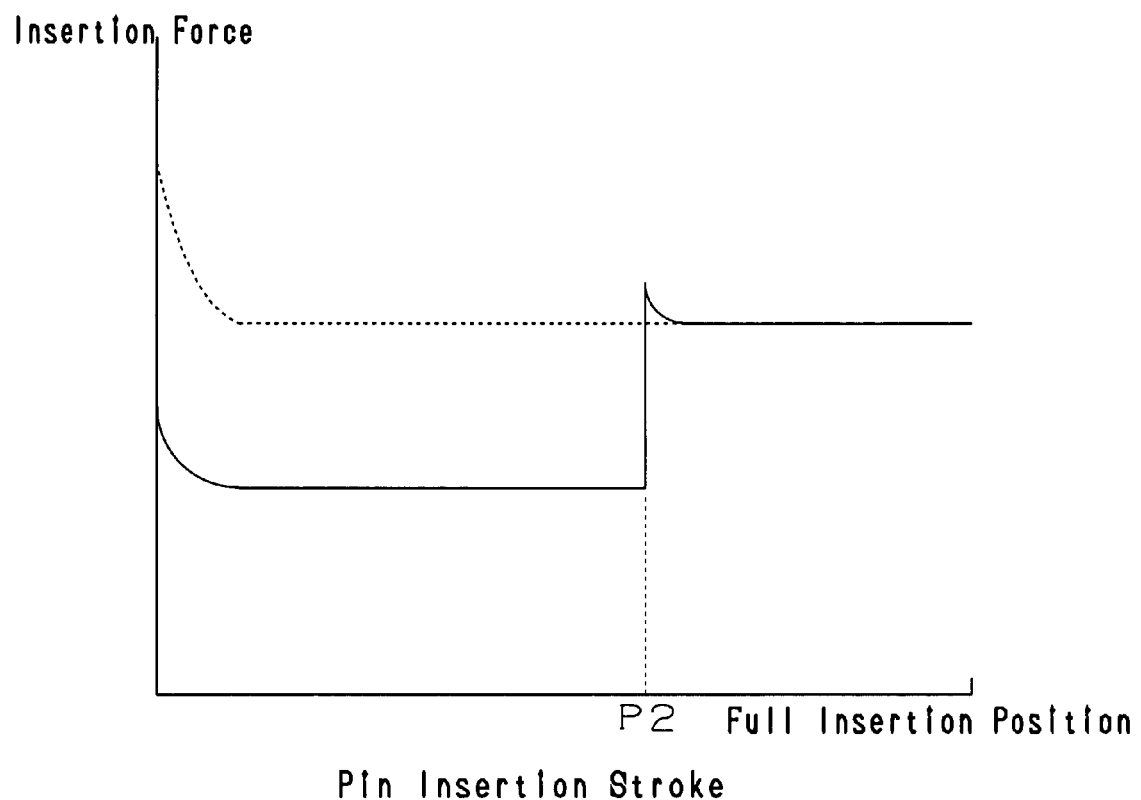
FIG. 22 is a graph comparing insertion force of the socket terminal in the first embodiment with the socket terminal in prior art.
Figure 28:
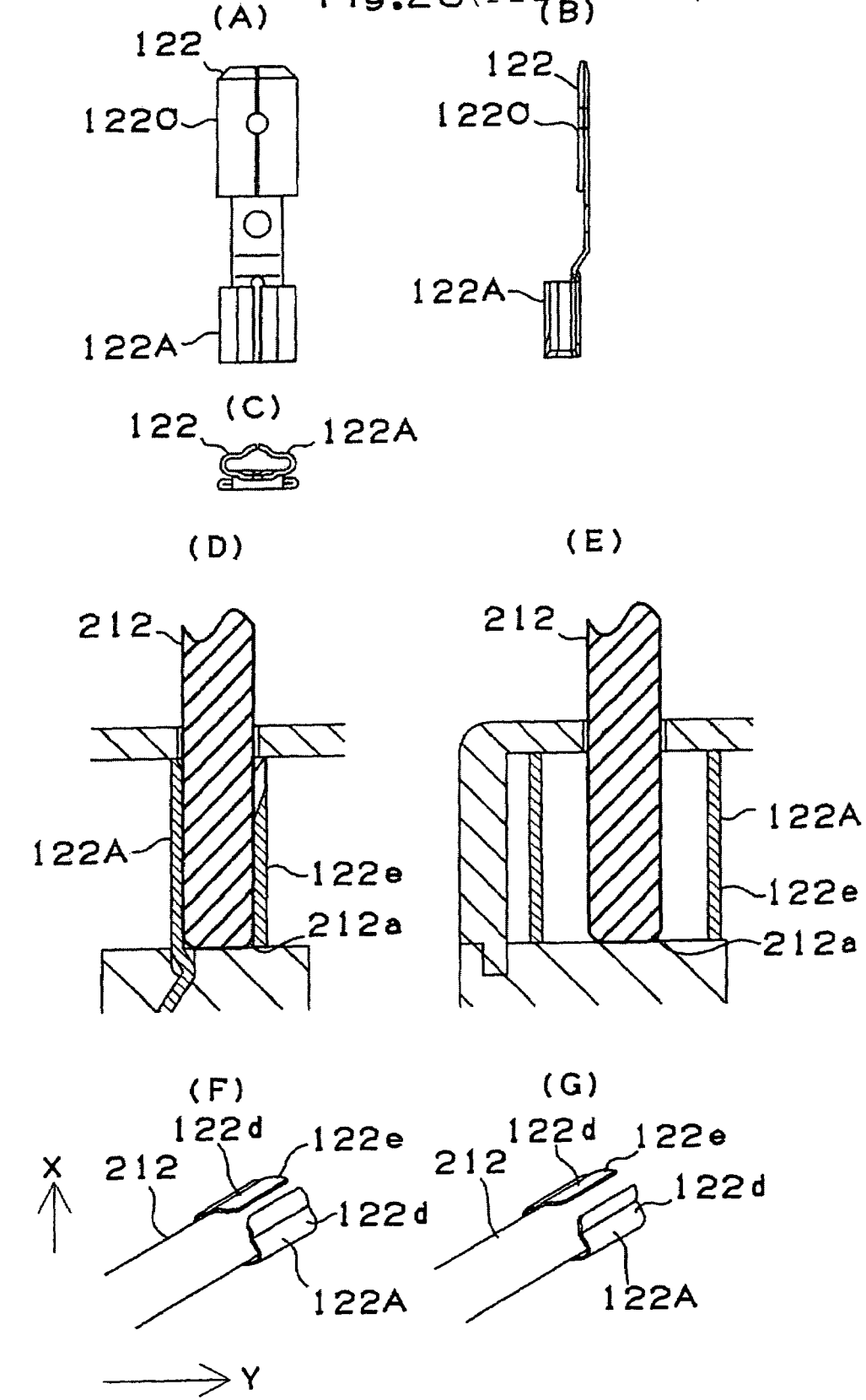
FIGS. 28 (A)-(G) are prior art.

The inserting effort required when inserting the connection pin is shown in FIG. 22. The axis of ordinates shows the insertion force, and the axis of abscissas denotes the pin insertion stroke. The chained line represents the insertion force when inserting the connection pin 212 into the socket terminal 122A of the prior art referring to FIG. 28. The solid line shows the insertion force when inserting the connection pin 116 into the socket terminal 22A in the first embodiment. The socket terminal 122A of the prior art shown in FIG. 28 (F) must push to spread open the entire connection pin holder (formed by folding plates 122d inside into the leading end in an arc to match with arc shape of the connection pin) 122e when the connection pin 212 is inserted. Ergo, a very large force is needed to insert, and the force needs to be maintained.

On the other hand, in socket terminal 22A of the first embodiment, when inserting into the connection pin, the first leading end first position 22g is spread, but compared with the connection pin holder 122e of socket terminal 122A of the prior art, it is enough to push open first position 22g half length in the axial direction, and only about half the insertion force is needed. When the leading end of connection pin 116 reaches the inner second position 22h (P2 in the diagram), the second position 22h begins to spread, but compared with the connection pin holder 122e of the socket terminal 122A of the prior art, large force is not needed. In addition, being guided by the first position 22g, the applied force acts to insert the connection pin 116 vertically and sideways force is not needed. Thus, in the socket terminal 22A of the first embodiment, when starting to insert the connection pin, it is enough to spread open only the divided leading end in first position 22g, and the insertion work is much easier as compared with the prior art which requires spreading the entire connection pin holder.

Socket terminal 22A of the first embodiment is the same in size as in the prior art; it saves space and is easy to install.

If there is an inclination between the connection pin 116 and the socket terminal 22A, since the leading end in the first position 22g and the inner side second position 22h contact the connection pin 116 independently (for example if the connection pin 116 and socket terminal 22A contact by point), the contact point is doubled and the connection pin and the socket terminal connect more securely.

As mentioned in relation to FIG. 18 (A), in the starter 10 of the first embodiment, since the recess 40a for holding chamfered leading end 116a of the connection pin 116 penetrating through the connection pin holder 22e is provided in casing 40, the chamfered leading end 116a of the leading end of the connection pin 116 is positioned in the recess 40a penetrating through connection pin holder 22e. In the prior art shown in FIG. 28 (D), FIG. 28 (E), since chamfered leading end 212a is positioned within the connection pin holder 122e, the leading end 212a cannot be gripped, and the gripping force on the connection pin holder 122e is lowered. By contrast, in the starter of the first embodiment, since the leading end 116a of chamfered connection pin 116 is not gripped by the connection pin holder 22e, the gripping force of the connection pin 116 in the connection pin holder 22e can be increased. In particular, in the first embodiment, the gripping force is lowered by the width of the slit 22f shown in FIG. 21 (A). However, by forming the recess 40a, the same gripping force can be obtained as the connection pin holder 122e of the same length as in the prior art without the slit.

The socket terminal 2A of the first embodiment is set, as shown in FIG. 19 (B), slightly larger in diameter φ1 of the leading end first position 22g of the connection pin holder 22e than diameter φ2 of the inner side second position 22h. That means the leading end first position 22g of the connection pin holder 22e is wider than the inner side second position 22h, so as to hold connection pin 116 more softly, hence, a smaller force is needed to insert the connection pin. On the other hand, since the inner second position 22h is more narrowly formed, a favorable contact state with connection pin 116 can be held by second position 22h, thus damage by overheating of the contact portion is prevented.

Modified Example of First Embodiment

Figure 11:
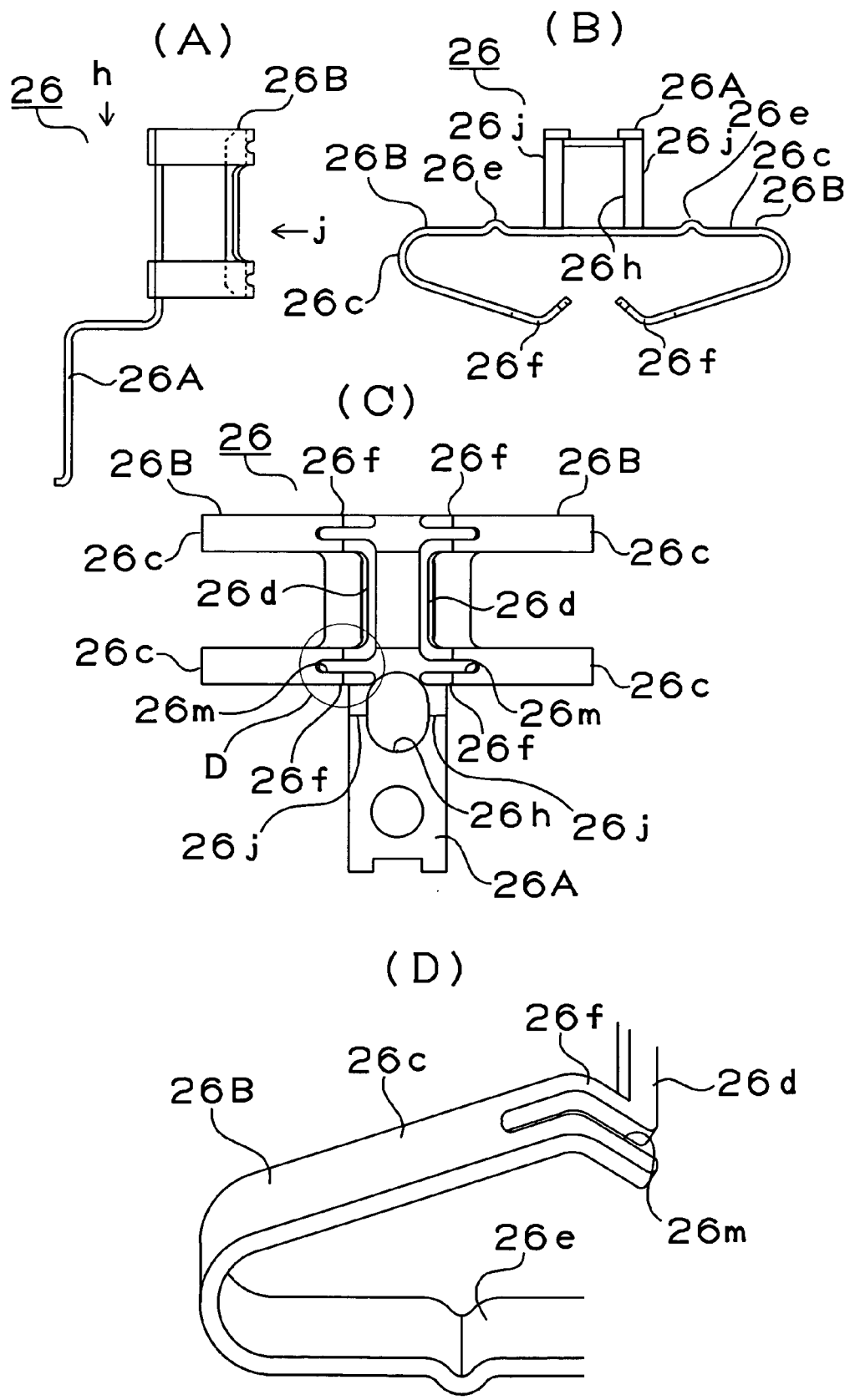
FIG. 11 (A) is a magnified view of first connection plate in a modified example of the first embodiment, FIG. 11 (B) is an arrow h-view of FIG. 11 (A), FIG. 11 (C) is an arrow j-view of FIG. 11 (A), and FIG. 11 (D) is a magnified perspective view of abutting portion with main PTC surrounded by circle D in FIG. 11 (C).

Referring now to FIG. 10 and FIG. 11, the starter in the modified example of the first embodiment is described. FIG. 10 (A) is a plan view of the snap action bimetal in a modified example of the first embodiment, FIG. 10 (B) is a sectional view of ON state of the snap action bimetal 18 of the starter in a modified example of the first embodiment, and FIG. 10 (C) is a sectional view OFF state.

A shown in FIG. 10 (A), in the modified example of the first embodiment, the snap action bimetal 18 is composed of one bimetal, comprising the movable contact plate 18e with a hole in the center and holding a movable contact point 18a, the bimetal portion 18f provided in the center of the hole, and the plate spring 18d is interposed between the first support point P1 of the movable contact plate 18e and the second support point P2 of the bimetal portion 18f. As shown in FIG. 10 (B) and FIG. 10 (C), the operation of the snap action bimetal 18 is the same as in the first embodiment shown in FIG. 8 (B) and FIG. 8 (C), and the description is omitted. FIG. 11 shows the first connection plate 26 in the modified example of the first embodiment. FIG. 11 (A) is a magnified view of the first connection plate 26 in a modified example of the first embodiment, FIG. 11 (B) is an arrow h-view of FIG. 11 (A), FIG. 11 (C) is an arrow j-view of FIG. 11 (A), and FIG. 11 (D) is a magnified perspective view of the abutting portion with the main PTC surrounded by circle D in FIG. 11 (C).

The first connection plate 26 in a modified example of the first embodiment is similar to the first connection plate in the first embodiment mentioned in FIG. 9. In the first embodiment, however, slot 26g was formed in the contacting corner 26f parallel to the extending direction of parallel portion 26c. By contrast in the modified example of the first embodiment, as shown in FIG. 11 (D), a notch 26m is provided in the contacting corner 26f parallel in the extending direction of the parallel portion 26c.

In the modified example of the first embodiment, notch 26m is provided in contacting angle 26f bent obtusely for contacting with main PTC 12 of spring member 26B for holding main PTC 12. As a result, the contact point of the contacting angle 26f and the main PTC 12 is doubled, enhancing the contact reliability. Further, the resonance frequency of the contacting corner 26f is different between the inside and outside of notch 26m. If the main PTC 12 and the spring member 26B resonate, and the electrode section of the main PTC 12 is hit by the spring member 26B, the electrode can be peeled. On the contrary, in the modified example, since the resonance frequency is different between the inside and outside of the contacting corner 26f, they do not resonate at the same time, therefore the contact portion 26*f* never hits the main PTC 12, and the electrode of the main PTC 12 will not be damaged.

Second Embodiment

The snap action bimetal 18 of the starter in the second embodiment is explained by referring to FIG. 12.

FIG. 12 (A) is a plan view of the snap action bimetal 18 of the starter in the second embodiment, and FIG. 12 (B) is a side view. FIG. 12 (C) is a plan view of the snap action bimetal 18 of the starter in the other example of the second embodiment, and FIG. 12 (D) is a side view of the other example. FIG. 12 (E) is an explanatory diagram of the ON state of the snap action bimetal 18 of the second embodiment, and FIG. 12 (F) is an explanatory diagram of the OFF state.

As shown in FIG. 12 (A), a slot is formed near the center of the bimetal of the flat plate of the snap action bimetal 18, and the central portion 18*h* around the slot is not processed. The two positions of the position 18*g* are processed by drawing at both sides of the slot. FIG. 12 (C) and FIG. 12 (D) are other examples of drawing at position 18*g* only. As shown in FIG. 12 (E) and FIG. 12 (F), the snap action bimetal 18 forms a snap action by drawing process.

In the starter of the second embodiment, the snap action bimetal 18 is made of a bimetal processed by drawing central position 18*h*, therefore the contact point can be cut off quickly. As a result, the arc does not continue, rough contact or noise does not occur, connection time after contact pressure becomes zero, and the contact is not opened or closed by vibration. Conclusively, the connection reliability of contact is high and durable.

Figure 20:
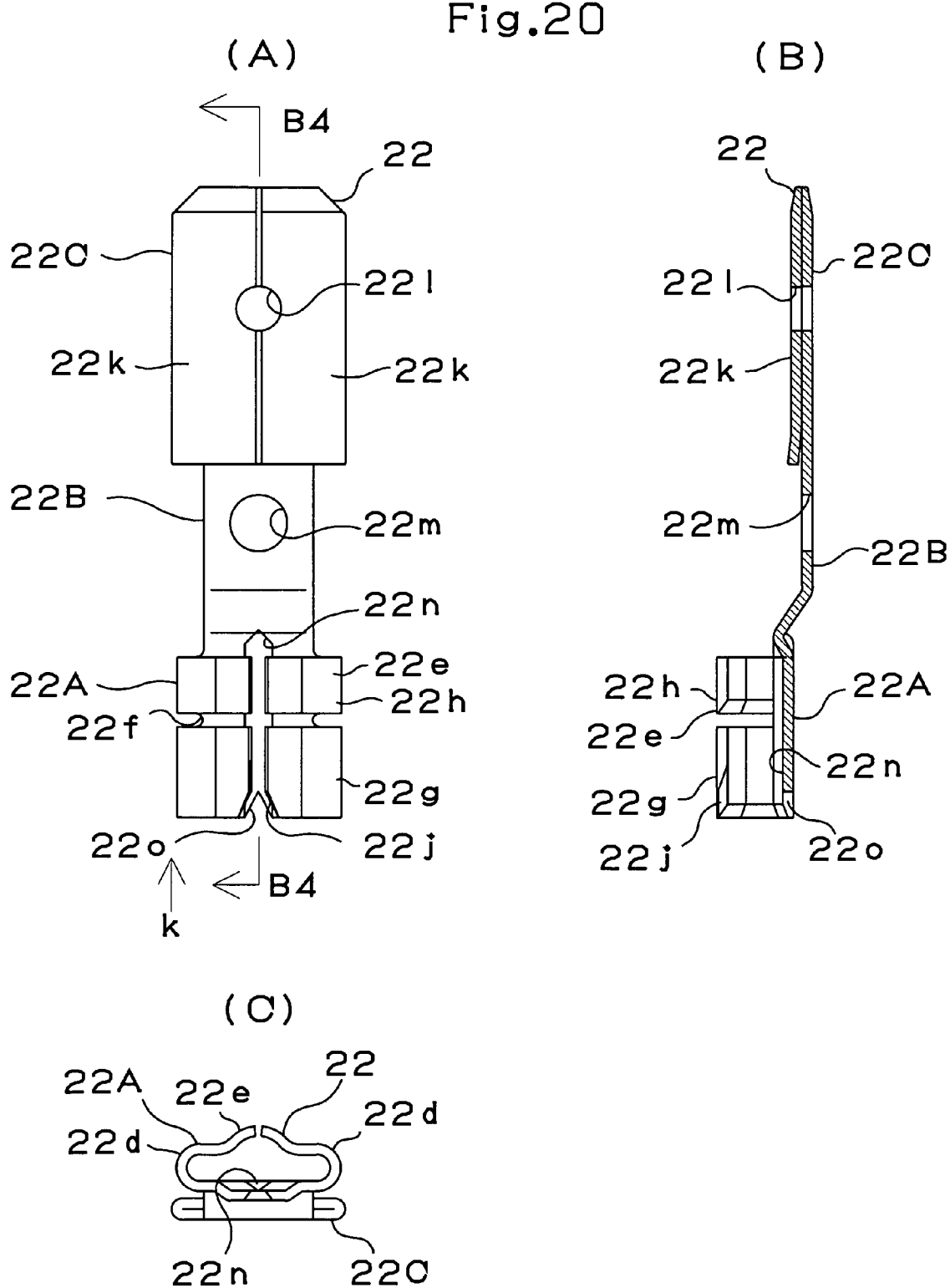
FIG. 20 (A) is a plan view of the terminal of the second embodiment, FIG. 20 (B) is a sectional view B4-B4 in FIG. 20 (A) and FIG. 20 (C) is an arrow k-view of FIG. 20 (A).

The structure of the terminal 22 of the starter 10 in the second embodiment is described by referring to FIG. 20.

FIG. 20 (A) is a plan view of the terminal 22 of the starter in the second embodiment, FIG. 20 (B) is a sectional view B4-B4 in FIG. 20 (A), and FIG. 20 (C) is an arrow k-view of FIG. 20 (A).

The starter in the second embodiment is the same as that of the first embodiment shown in FIG. 5 and FIG. 6. In the first embodiment, however, the leading end of the first position 22*g* of the connection pin holder 22*e* of the socket terminal 22A and the inner side second position 22*h* were equal in length in the connection pin axial direction. In the second embodiment, the length of the leading end in first position 22*g* of the connection pin holder 22*e* is formed to be longer than that of the length of inner side second position 22*h* in the connection pin axial direction. Accordingly, the galling force of inserting the connection pin is only received in the first position 22*g*, since the spreading of the galling force into second position 22*h* is arrested. Hence, a favorable contact state with the connection pin 116 is maintained at second position 22*h*, and damage by overheating of the connection portion does not occur.

Modified Example of Second Embodiment

Referring now to FIG. 13, the snap action bimetal 18 of the starter in the modified example of the second embodiment is described. FIG. 13 (A) is a plan view of snap action bimetal 18 of the starter in a modified example of the second embodiment, FIG. 13 (B) is a side view, FIG. 13 (C) is an explanatory view of the ON state of the snap action bimetal 18 in a modified example of the second embodiment, and FIG. 13 (D) is an explanatory view of the OFF state.

As shown in FIG. 13 (A), the snap action bimetal 18 is processed by forming of deformation 18*i* in the center of the plate. As shown in FIG. 13 (C) and FIG. 13 (D), the snap action bimetal 18 can realize the snap action by formation of processing.

For the starter in the modified example of the second embodiment, the snap action bimetal 18 is composed of a bimetal processed by forming of deformation 18*i*, and the contact point can be cut off quickly. As a result, the arc does not continue, the rough contact or noise does not occur, connection time after contact pressure becomes zero, and the contact is not opened or closed by vibration. Hence the connection reliability of contact is made high and durable.

Third Embodiment

Bimetal 18 of the starter in the third embodiment is explained by referring to FIG. 14.

FIG. 14 (A) is an explanatory diagram of ON state of bimetal 18 of the third embodiment, and FIG. 14 (B) is an explanatory diagram of OFF state of bimetal 18.

The Bimetal 18 of the third embodiment comprises (same as in the first and second embodiment) an auxiliary PTC disposed at the base and movable contact point 18*a* at the free end side. A Magnet 23A for applying magnetic force to the bimetal 18 in a direction forcing the movable contact point 18*a* to a fixed contact point 36*a* side is provided adjacently to bimetal 18. This other configuration is the same as in the first embodiment explained in FIG. 1 to FIG. 9, (the explanation is omitted).

In the starter of the third embodiment, the bimetal 18 has a movable contact point 18*a* at the free end side and is forced to contact the ON side by the magnetic force of magnet 23A. When the bimetal 18 is cut off, the magnetic force of the magnet 23A decreases inversely proportional to the square of the distance. Therefore, the bimetal 18 has the strongest magnetic force at movable contact point 18*a* in the ON state as shown in FIG. 14 (A), and after the movable contact point 18*a* leaves as shown in FIG. 14 (B), the magnetic force decreases suddenly, so the movable contact point 18*a* can be cut off quickly from the fixed contact point 36*a*. This discontinues the arc, the rough contact or noise does not occur, connection time after contact pressure becomes zero, and the contact is not opened or closed by vibration. Thus, the connection reliability of contact is high and durable.

Figure 21:
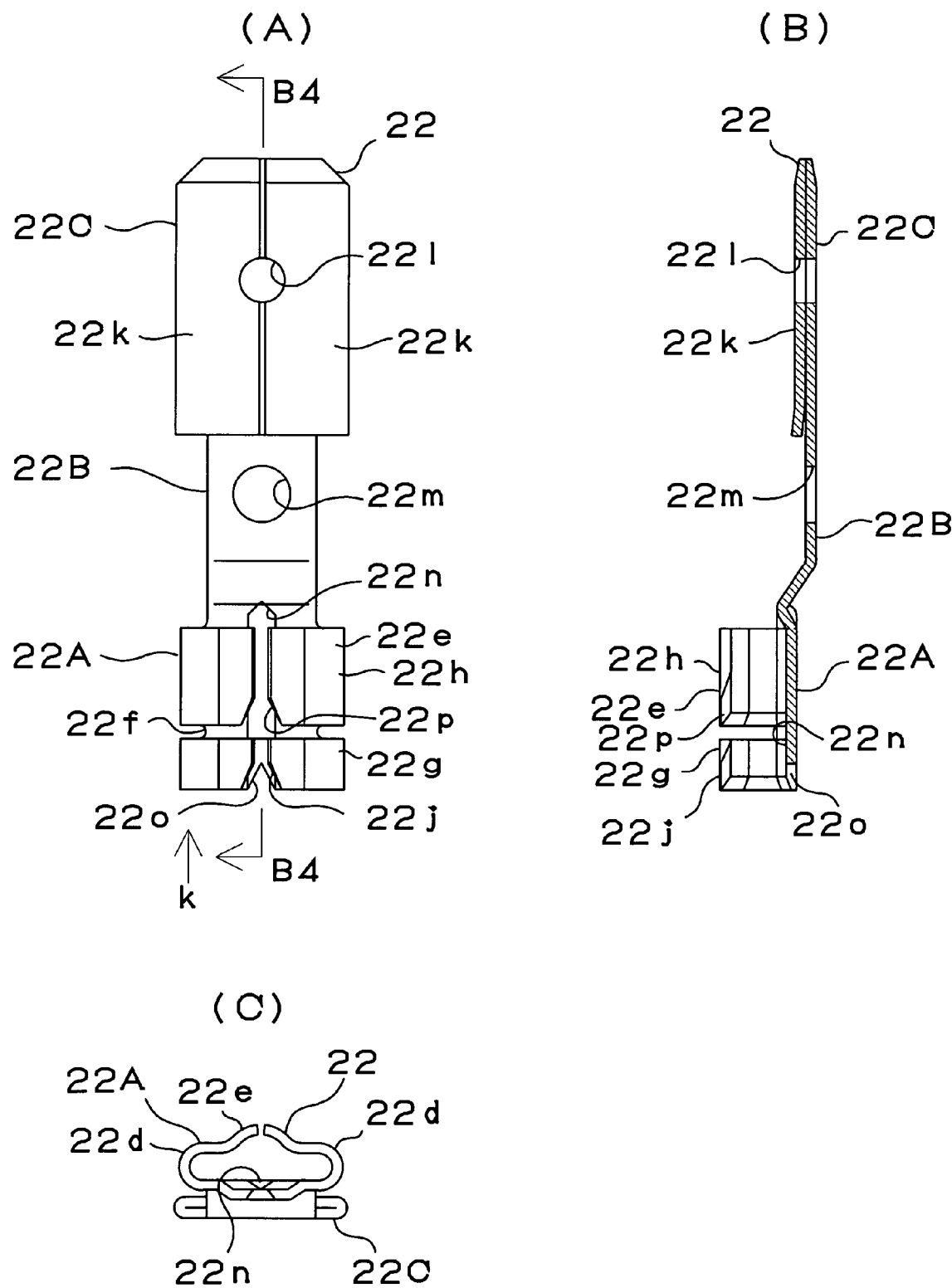
FIG. 21 (A) is a plan view of the terminal of the third embodiment, FIG. 21 (B) is a sectional view B4-B4 in FIG. 21 (A), and FIG. 21 (C) is an arrow k-view of FIG. 21 (A).

The structure of the terminal 22 of the starter 10 in the third embodiment is described by referring to FIG. 21.

FIG. 21 (A) is a plan view of the terminal 22 of the starter in the third embodiment, FIG. 21 (B) is a sectional view B4-B4 in FIG. 21 (A), and FIG. 21 (C) is an arrow k-view of FIG. 21 (A).

The starter in the third embodiment is the same as that of the first embodiment shown in FIG. 5 and FIG. 6. In the first embodiment, however, the leading end at first position 22*g* of the connection pin holder 22*e* of the socket terminal 22A and the inner side of the second position 22*h* were equal in length in the connection pin axial direction. In the third embodiment, the length of the inner side second position 22*h* of the connection pin holder 22*e* is formed to be longer than the length of the leading end of the first position 22*g* in the connection pin axial direction. Accordingly, by holding the connection pin 116 firmly by the second position, 22*h*, fatigue does not occur, and a favorable contact state with connection pin 116 is maintained, and damage by heating of connection portion does not occur.

In the third embodiment, V-notch 22*p* is cut at the leading end of the inner side second position 22*h* of the connection pin holder 22*e*. When inserting into the connection pin 116, after the leading end of the connection pin 116 passing through leading end of the first position 22g reaches inner side second position 22h, it becomes easy inserting it into second position 22h side.

Fourth Embodiment

Switch 18 of the starter in the fourth embodiment is explained by referring to FIG. 15.

FIG. 15 (A) is an explanatory diagram of the ON state of switch 18 of the fourth embodiment, and FIG. 15 (B) is an explanatory diagram of the OFF state of switch 18.

Switch 18 of the fourth embodiment is composed of a magnetic conductive material, and has movable contact point 18a provided at the free end side. A temperature sensing magnet 23B for applying magnetic force to the switch 18 in a direction of forcing a movable contact point 18a to a fixed contact point 36a side is provided immediately above the switch 18, and the auxiliary PTC is provided adjacently to the temperature sensing magnet 23B. This other configuration is the same as in the first embodiment explained in FIG. 1 to FIG. 9, and the explanation is omitted.

In the starter of the fourth embodiment, the switch 18 is made of a magnetic conductive member with a movable contact point 18a at the free end side of the spring plate. It senses heat from the auxiliary PTC. When the temperature reaches the set temperature, it is forced by the magnetic force of the temperature sensing magnet 23B which is demagnetized. At a lower temperature than the set temperature as shown in FIG. 15 (A), a switch 18 is attracted by the magnetic force of the temperature sensing magnet 23B by resisting the elasticity of the spring plate, turning the switch on. On the other hand, when the temperature reaches the set temperature as shown in FIG. 15 (B), a switch 18 is turned off by the elasticity of the spring plate due to the demagnetization of the temperature sensing magnet 23B. Upon the magnet turning off, the magnetic force from temperature sensing magnet 23B drops inversely proportional to the square of the distance. The switch 18 receives the strongest magnetic contact force in the ON state. After the movable contact point 18b is disconnected, the magnetic force decreases rapidly, so that the movable contact point 18a can be cut off quickly from the fixed contact point 36a, this discontinues the arc, the rough contact or noise does not occur, the connection time after contact pressure becomes zero, and the contact is not opened or closed by vibration. Thus, the connection reliability of contact is high and durable.

Fifth Embodiment

Figure 16:
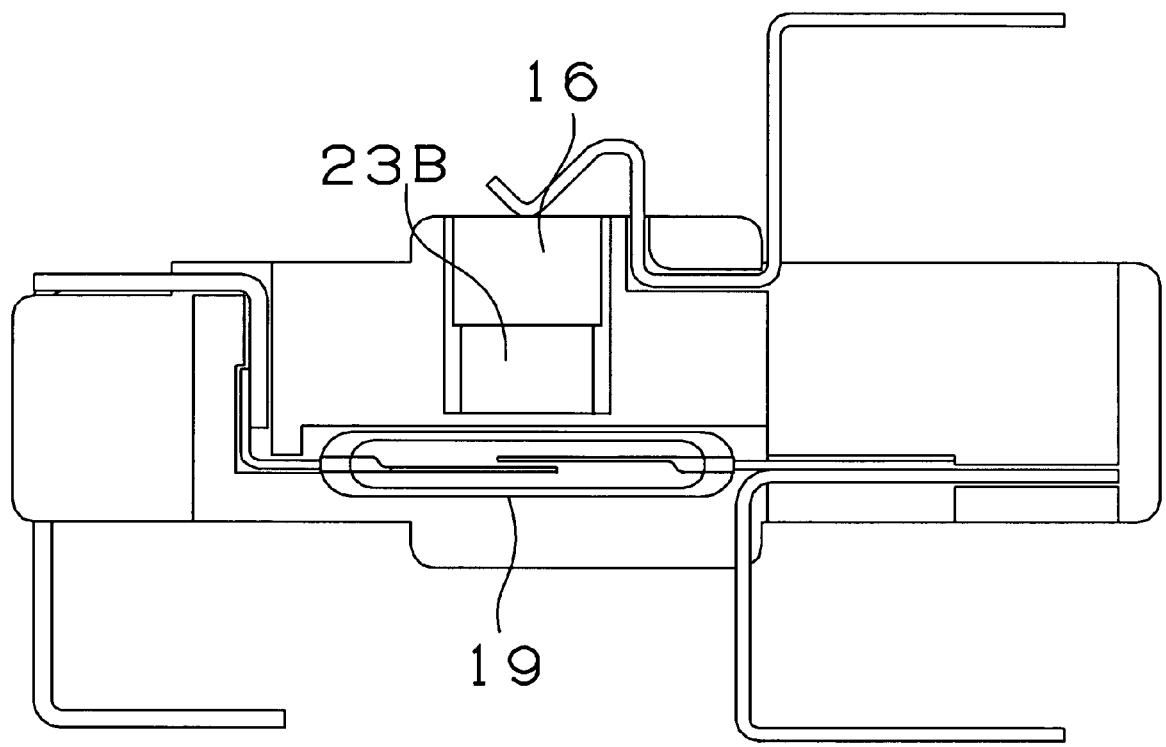
FIG. 16 is an explanatory diagram of reed switch of starter in the fifth embodiment.

The reed switch 19 of the starter in the fifth embodiment is explained by referring to FIG. 16.

In the fourth embodiment, the switch 18 is composed of a magnetic conductive material, but in the fifth embodiment, the reed switch 19 is used instead of the normal switch. A Temperature sensing magnet 23B for applying a magnetic force to the reed switch 19 in a direction forcing contact with the ON side is provided immediately above the reed switch 19, and the auxiliary PTC 16 is provided adjacently to the temperature sensing magnet 23B. This other configuration is the same as in the first embodiment explained in FIG. 1 to FIG. 9, and the explanation is omitted.

In the starter of the fifth embodiment, the reed switch 19 senses heat from the auxiliary PTC 16. When the temperature reaches the set temperature, it turns on or off depending on the magnetic force of the temperature sensing magnet 23B which is demagnetized. At a lower temperature than the set temperature, the reed switch 19 is turned on by the magnetic force of temperature sensing magnet 23B, on the other hand, when the temperature reaches the set temperature, the reed switch 19 is turned off by the demagnetization of the temperature sensing magnet 23B. At this time, the magnetic force from the temperature sensing magnet 23B drops to inversely proportional to the square of the distance, and the reed switch 19 is cut off quickly. As a result, the arc does not continue, the rough contact or noise does not occur, connection time after contact pressure becomes zero, and the contact is not opened or closed by vibration. Thus, the connection reliability of contact is high and durable.

Figure 17:
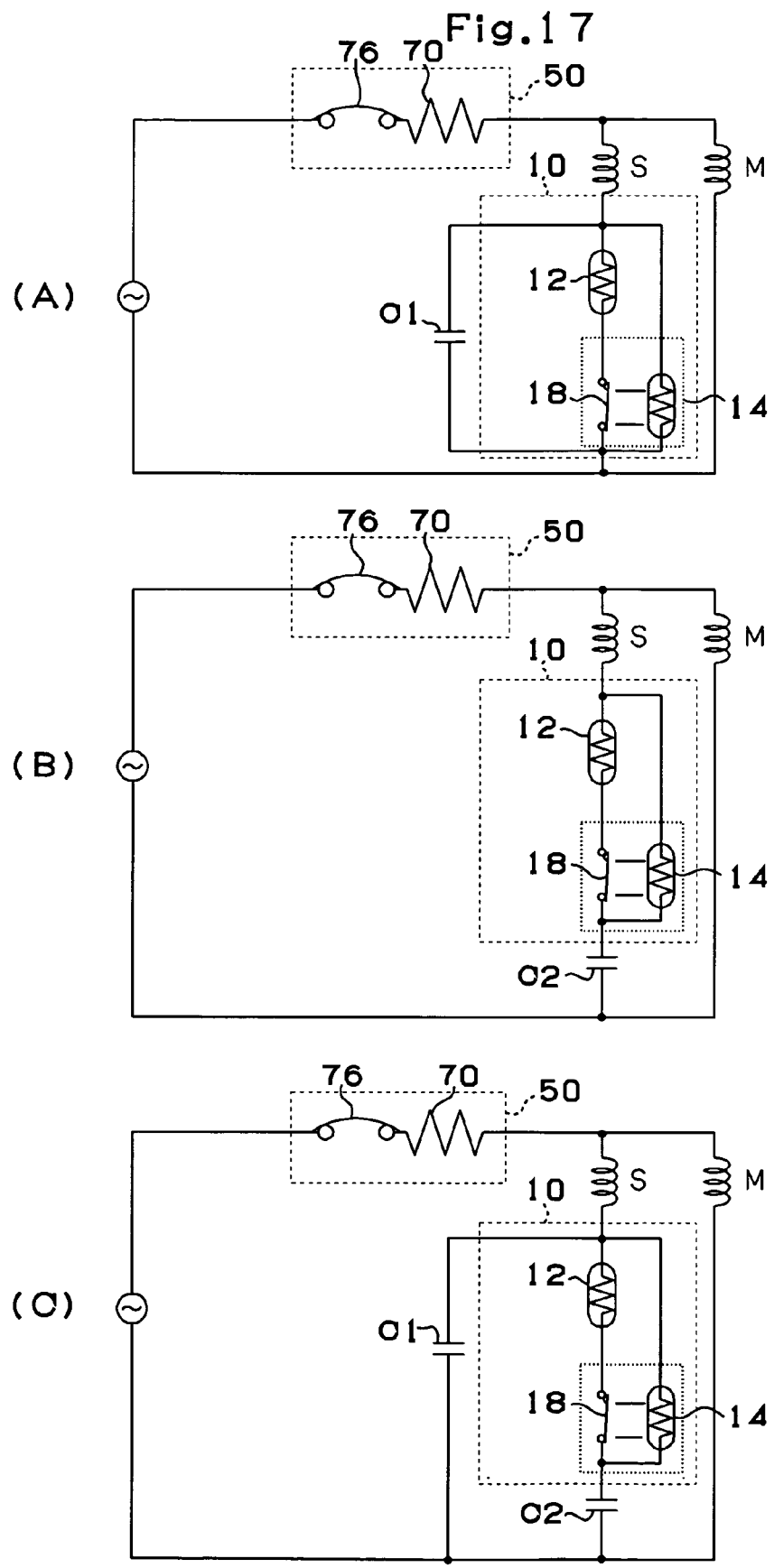
FIG. 17 (A), FIG. 17 (B), and FIG. 17 (C) are circuit diagrams of application examples of starter in this embodiment.

FIG. 17 shows the circuit of the starter 10 of the embodiment: Referring to FIG. 2, not limited to the circuit not using the capacitor, the starter 10 of the embodiment can be suitably used when the running capacitor C1 is connected parallel to the starter 10 as shown in FIG. 17 (A), or when the starting capacitor C2 is connected in series to the starter 10 (as shown in FIG. 17 (B)), or when the starting capacitor C2 is connected in series to the running capacitor C1 parallel to starter 10 as shown in FIG. 17 (C).

Sixth Embodiment

The sixth embodiment is the same as the first embodiment, and by referring to FIG. 1 or to FIG. 7, its explanation is omitted. In the first embodiment, a snap action bimetal is used, but in the sixth embodiment, a slow action bimetal is used. Heretofore in the sixth and seventh embodiments, part 18 refers to the slow action bimetal.

The operation of the starter 10 in the sixth embodiment is explained: when the operation switch 97 is turned on, a starting current flows through the main winding M by way of the operation switch 97 and the overload relay 50. Since the main PTC 12 is low in resistance (for example, about 5 ohms) at an ordinary temperature, and starting current flows in the series circuit of the auxiliary winding S, the main PTC 12, the slow action bimetal 18, and parallel circuit of auxiliary PTC 14. Subsequently, the single-phase induction motor 100 is started up.

When the starting current of the auxiliary winding S flows into the main PTC 12, the main PTC 12 and the auxiliary PTC 14 generates heat, and this electrical resistance increases rapidly. Several seconds later, the main PTC 12 and the auxiliary PTC 14 reach the temperature of 140 deg. C., and the electrical resistance of the main PTC 12 at this time is, for example: 1 to 10 kohms. Thus, the current flowing in the slow action bimetal 18 decreases. When the auxiliary PTC 14 reaches the temperature of 140 deg. C., the slow action bimetal 18 is turned off, and no current flows into the series circuit of the main PTC 12 and the slow action bimetal 18. Thereby, the single-phase induction motor 100 starts up completely, initiating stationary operation.

When the slow action bimetal 18 is turned off, current flows only into the auxiliary PTC 14 side, which generates heat therein. The slow action bimetal 18 senses the generated heat, and stays in the OFF state.

Therefore, during stationary operation of the single-phase induction motor 100, no current flows into the main PTC 12, instead, current flows into the auxiliary PTC 14 side. However, the current flowing in auxiliary PTC 14 side is very small, and is only enough to generate heat for maintaining the OFF state of the slow action bimetal 18. Additionally, the power consumption by the auxiliary PTC 14 is extremely small compared with the power consumption by the conventional positive characteristic thermistor. Further, since the slow action bimetal is used, as compared with the former snap action bimetal, it can be used for a longer period of time.

During stationary operation of the single-phase induction motor 100, the main PTC 12 of a large thermal capacity is cooled to an ordinary temperature. On the other hand, since the auxiliary PTC 14 is small in thermal capacity, it is quick to cool. Therefore, if attempting to start again immediately after stopping the single-phase induction motor 100 (since auxiliary PTC 14 is quickly cooled nearly to ordinary temperature and it is ready to restart in about several seconds to dozens of seconds), it is started quickly without repeating operation and reset of the overload relay as in the prior art.

Figure 23:
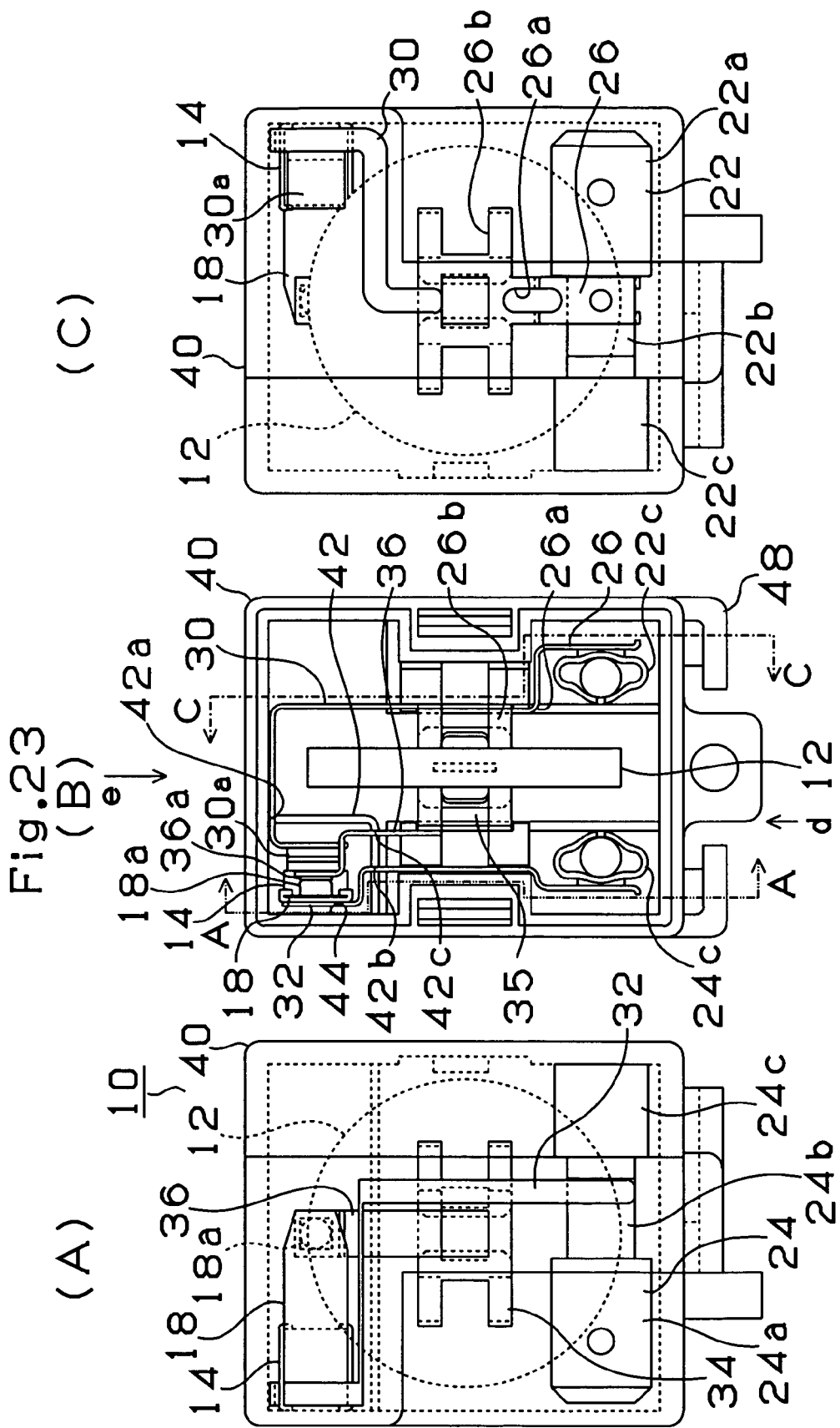
FIG. 23 (B) is a plan view with the lid removed of the starter in the sixth embodiment of the invention, FIG. 23 (A) is a sectional view A-A in FIG. 23 (B), and FIG. 23 (C) is a sectional view C-C in FIG. 23 (B).

The mechanical structure of the starter 10 of the sixth embodiment is described by referring to FIG. 23 and FIG. 24.

FIG. 23 (B) is a plan view with the lid removed of the starter of the single-phase induction motor in the sixth embodiment of the invention, FIG. 23 (A) is a sectional view A-A of FIG. 23 (B), and FIG. 23 (C) is a sectional view C-C in FIG. 23 (B). FIG. 24 (A) is arrow e-view of FIG. 23 (B), and FIG. 24 (B) is arrow d-view of FIG. 23 (B). As shown in FIG. 24 (B), the starter 10 has casing 40, lid 46, and flange 48 for mounting the overload relay 50 on the outside.

As shown in FIG. 23 (C), inside of the casing 40, the terminal 22 is provided to be connected to the auxiliary winding S side. The terminal 22 is integrally formed of the tab terminal 22a, the pin terminal 22c, and the coupler 22b that links them. The coupler 22b has the first connection plate 26 with spring member 26b for supporting the main PTC 12. The first connection plate 26 is bent like a crank in the middle, and a through-hole 26a is formed in the bent portion on the spring member 26b side. The first connection plate 26 is narrow at the through-hole 26a, and when a large current flows, it is designed to meltdown at the outer circumference of said through-hole 26a.

One end of the second connection plate 30 is connected to the spring member 26b. The spring member 30a at the other end of the second connection plate 30 holds the auxiliary PTC 14 by applying spring pressure. The auxiliary PTC 14 contacts the base of the slow action bimetal 18. As shown in FIG. 23 (A) and FIG. 23 (B), the spring member 30a of the second connection plate 30, the auxiliary PTC 14, the base of slow action bimetal 18, and one end of third connection plate 32, are connected adjacently to each other. The other end of third connection plate 32 is connected to the coupler 24b (see FIG. 23 (A)) of the terminal 24 for connecting to power line 98 side and main winding M. Terminal 24 is integrally formed of tab terminal 24a, pin terminal 24c, and coupler 24b for linking them.

On the other hand, at the leading end of slow action bimetal 18, movable contact point 18a is provided, and contacts with fixed contact point 36a of crank shaped fixed contact plate 36. The other end of fixed contact plate 36 is fixed to second spring 35 for holding main PTC 12.

The slow action bimetal 18 and the auxiliary PTC 14 are accommodated in the enclosed compartment 44 formed by the L-shaped partition wall 42 provided inside the casing 40. The enclosed compartment 44 has an airtight structure. The second connection plate 30 is distributed in an enclosed compartment 44 by way of a through-hole 42a provided in the partition wall 42, and the third connection plate 32 by way of a through-hole 42b, and a fixed contact plate 36 by way of through-hole 42c.

In the starter 10 of the sixth embodiment, since the slow action bimetal 18 and the auxiliary PTC 14 are accommodated in the enclosed compartment 44 in the casing 40, heat hardly escapes and the OFF state of slow action bimetal 18 can be maintained by very little power consumption. Further, the refrigerant of the enclosed compressor—flammable gas (hydrocarbon compound such as butane)—is used, and even in the event that refrigerant leaks, it is ultimately contained within the enclosed compartment 44. Thus, is not ignited by spark when opening or closing the slow action bimetal 18.

Further, since the auxiliary PTC 14 directly contacts the base of the slow action bimetal 18, heat from the auxiliary PTC 14 can be efficiently transmitted to the slow action bimetal 18, and the OFF state of the slow action bimetal 18 can be maintained by the auxiliary PTC 14 with little power consumption.

Seventh Embodiment

Figure 25:
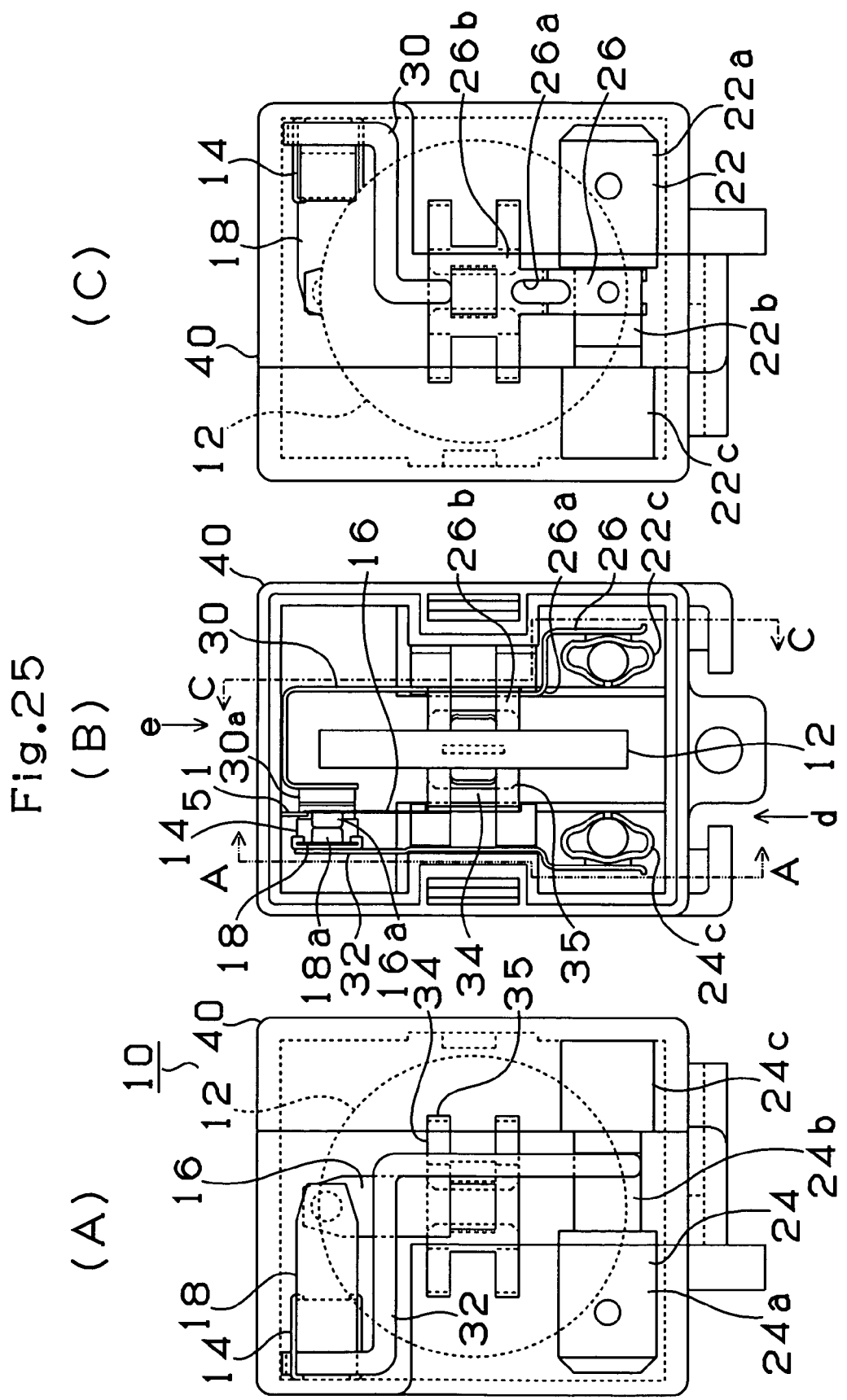
FIG. 25 (B) is a plan view with the lid removed of the starter in the seventh embodiment of the invention, FIG. 25 (A) is a sectional view A-A in FIG. 25 (B), and FIG. 25 (C) is a sectional view C-C in FIG. 25 (B).
Figure 26:
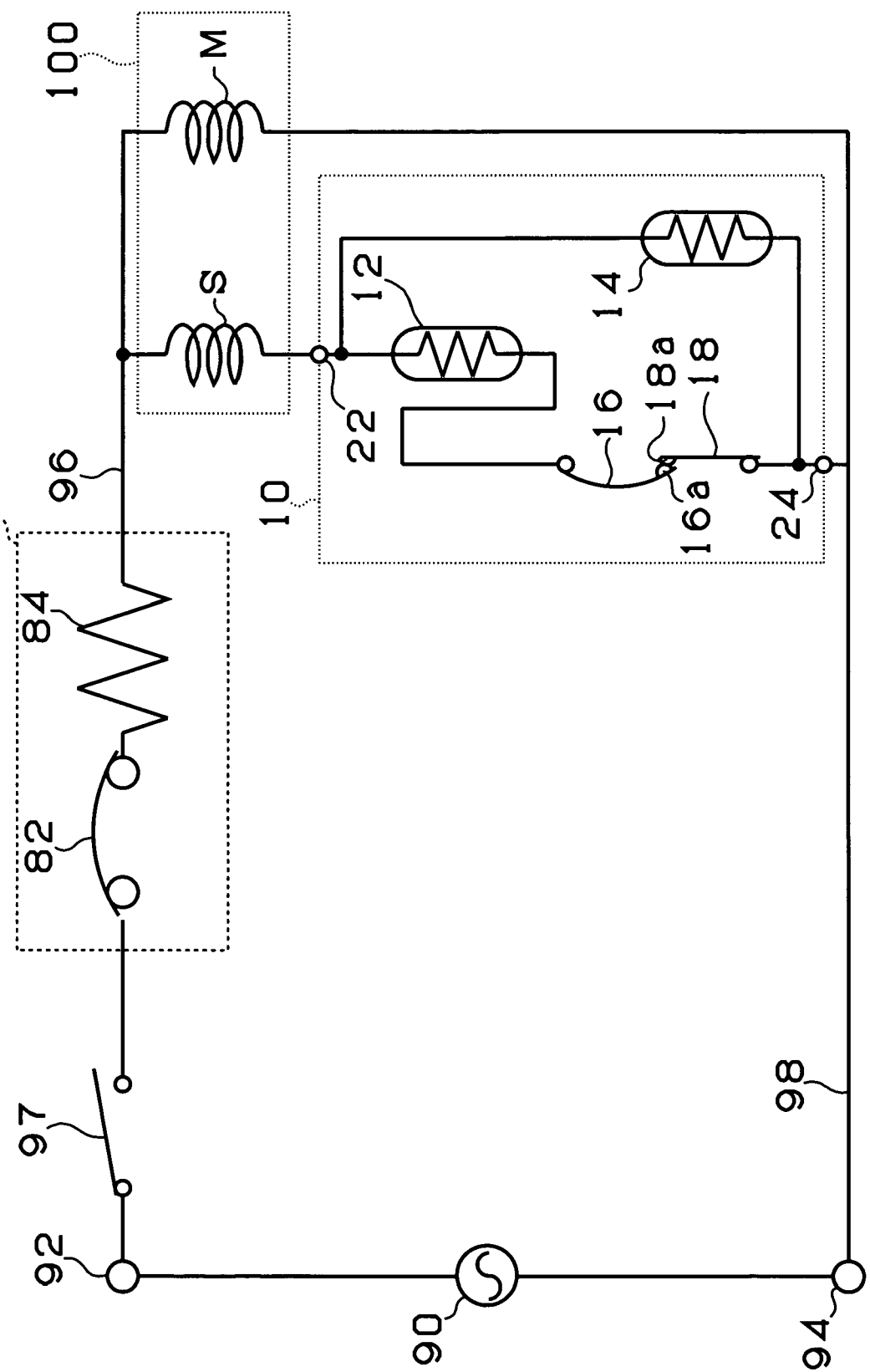
FIG. 26 is a circuit diagram of the starter in the seventh embodiment.

The seventh embodiment of the invention is explained by referring to FIG. 25 and FIG. 26. FIG. 26 is a circuit diagram of the starter in the seventh embodiment.

The circuit configuration of the starter 10 of the seventh embodiment is the same as in the starter of the sixth embodiment. However, in the seventh embodiment, a normally closed snap action bimetal 16 (for protection from thermal runaway of main PTC 12) is connected in series to the main PTC 12 and the slow action bimetal 18.

The operation of the starter 10 in the seventh embodiment is explained. When the operation switch 97 is turned on, a starting current flows through the main winding M by way of the operation switch 97 and the overload relay 50. Since the main PTC 12 is low in resistance (for example, about 5 ohms) at ordinary temperature, and starting current flows in both series circuit of the auxiliary winding S, the main PTC 12, the slow action bimetal 18, and the parallel circuit of auxiliary PTC 14. Thus, the single-phase induction motor 100 is started up.

When starting the current of the auxiliary winding S flowing into the main PTC 12, the main PTC 12 and the auxiliary PTC 14 generate heat, and that electrical resistance increases rapidly. Therefore, the current flowing in the slow action bimetal 18 decreases. When the auxiliary PTC 14 reaches 140 deg. C., the slow action bimetal 18 detects it and is turned off. As a result, no current flows into the series circuit of the main PTC 12, the snap action bimetal 16, and the slow action bimetal 18, thus, finishing the starting procedure of the single-phase induction motor 100.

When the slow action bimetal 18 is turned off, the current flows only into the auxiliary PTC 14 side, and generates heat therein. The Slow action bimetal 18 senses the generated heat, and is kept in OFF state.

Therefore, during the stationary operation of the single-phase induction motor 100, no current flows into the main PTC 12, instead, current flows into the auxiliary PTC 14 side. However, the current flowing into the auxiliary PTC 14 side is very small and only enough to generate heat for keeping the OFF state of slow action bimetal 18. Subsequently, the power consumption by the auxiliary PTC 14 is extremely small compared with the power consumption by the conventional positive characteristic thermistor.

During stationary operation of the single-phase induction motor 100, the main PTC 12 of the large thermal capacity is cooled to ordinary temperature. On the other hand, since auxiliary PTC 14 is small in thermal capacity, it is therefore quick to cool. Hence, if attempting to start again immediately after stopping the single-phase induction motor 100 (since auxiliary PTC 14 is quickly cooled almost at ordinary temperature), and it is ready to restart in about several seconds to dozens of seconds.

The following is an explanation of operation in the case of an abnormal heat generation on the main PTC 12 before actuation of the slow action bimetal 18 by the auxiliary PTC 14.

When the main PTC 12 generates abnormal heat attempting to reach a specified temperature, the snap action bimetal 16 is cut off, and the current to the auxiliary winding S is cut off. As a result, the thermal runaway occurs at the main PTC 12 (main PTC 12 becomes low in resistance at high temperature) and thus insulation breakdown (due to the flow of large current into auxiliary winding S) can be prevented. In particular, since the snap action bimetal 16 is set not to reset at ordinary temperature, thermal runaway at the main PTC 12 can be completely prevented.

The mechanical structure of the starter 10 in the seventh embodiment is explained by referring to FIG. 25. The side view of the starter 10 of the seventh embodiment is the same as in the sixth embodiment shown in FIG. 24. By referring to this diagram, detailed explanation is omitted.

FIG. 25 (B) is a plan view with the lid removed of the starter of the single-phase induction motor in the sixth embodiment of the invention, FIG. 25 (A) is a sectional view A-A of FIG. 25 (B), and FIG. 25 (C) is a sectional view C-C of FIG. 25 (B). FIG. 24 (A) is an arrow e-view of FIG. 25 (B), and FIG. 24 (B) is an arrow d-view of FIG. 25 (B).

As shown in FIG. 25 (C), inside of the casing 40, the terminal 22 connected to the auxiliary winding S side in FIG. 26 is provided. The terminal 22 is integrally formed by the tab terminal 22a, the pin terminal 22c, as well as, the coupler 22b for linking them. The coupler 22b has the first connection plate 26 with the spring member 26b for holding the main PTC 12. The first connection plate 26 has its center bent like a crank, and a through-hole 26a is formed in the bent portion to the spring member 26b side. The first connection plate 26 is narrow at the through-hole 26a, and it is designed to meltdown at the outer circumference of said through-hole 26a when a large current flows.

One end of the second connection plate 30 is connected to the spring member 26b. The spring member 30a, formed at other end of second plate 30, applies spring pressure to the auxiliary PTC 14 and holds it. The auxiliary PTC 14 contacts the base of the slow action bimetal 18. As shown in FIG. 25 (A) and FIG. 25 (B), the spring member 30a of the second connection plate 30, auxiliary PTC 14, base of slow action bimetal 18, and one end of the third connection plate 32, are connected adjacently. The other end of third connection plate 32 is connected to the coupler 24b (see FIG. 25 (A)) of the terminal 24 for connecting to the power line 98 side and main winding M shown in FIG. 26. The terminal 24 is integrally formed by the tab terminal 24a, the pin terminal 24c, as well as, the coupler 24b for linking them.

On the other hand, at the leading end of the slow action bimetal 18, the movable contact point 18a is provided, and contacts the movable contact point 16a of the snap action bimetal 16. The base of the snap action bimetal 16 is fixed to the second spring 35 in order to hold the main PTC 12. In the casing 40, on the other hand, the stopper 51 (extending to the leading end of the snap action bimetal 16) is provided, and it is configured so that the snap action bimetal 16 may not interrupt the operation of the slow action bimetal 18.

In the starter 10 of the seventh embodiment, the movable contact point 18a of the slow action bimetal 18 and the movable contact point 16a of the snap action bimetal 16 directly contact each other. When the slow action bimetal 18 reaches the set temperature, it departs from the movable contact point 16a of the snap action bimetal 16; when the snap action bimetal 16 reaches the specified high temperature, it departs from the movable contact point 18a of the slow action bimetal 18 side. When the slow action bimetal 18 is cut off by the application of heat, heat is also applied to the snap action bimetal 16 side, slightly moving it away from the movable contact point 18a of the slow action bimetal 18. Therefore, by using the slow action bimetal (which is long in life but slow in action), the starting current can be cut off appropriately. Thus, along with the rising temperature, the bimetals depart mutually from each other, resulting in little chattering. Further, both the contacts are made of movable contact points, and the wiping (rubbing) phenomenon always occurs when the temperature changes. Subsequently, the contact portions of the movable contact portions 16a, 18a are cleaned. Thus, a long life is assured by using silver contacts, instead of gold plating contacts. Since the movable contact point 18a of the slow action bimetal 18 and movable contact point 16a of the snap action bimetal 16 directly contact each other, lower cost and lower resistance can be realized (as compared with the use of an interposed terminal member of metal plating with fixed contact points on both).

In the starter 10 of the seventh embodiment, having the stopper 51 contact the leading end of the snap action bimetal 16, it is designed not to interrupt the operation of the slow action bimetal 18. Hence, after completion of start-up (when main PTC 12 is cooled and snap action bimetal 16 returns to ordinary temperature), warping the slow action bimetal 18 side is prevented, and an adequate contact gap can be maintained.

INDUSTRIAL APPLICABILITY

The invention can be applied not only for driving the closed compressor of the refrigeration cycle in refrigerator, but also for driving the closed compressor of refrigeration cycle of an air conditioner. Further, it can be applied in appliances generally driven by a single-phase induction motor of capacitor starting type or of a split phase starting type. The invention can be changed and modified within the scope insofar as not departing from the true spirit thereof.

The invention claimed is:

1. A starter of single-phase induction motor having main winding and auxiliary winding energized by alternating current power source, comprising:
   a casing,
   a positive characteristic thermistor connected in series to the auxiliary winding,
   an auxiliary positive characteristic thermistor connected parallel to the positive characteristic thermistor and a snap action bimetal,
   the snap action bimetal connected in series to a series circuit of auxiliary winding and positive characteristic thermistor for sensing the heat from the auxiliary positive characteristic thermistor and turning off when reaching a set temperature, and
   an enclosed compartment accommodated in the casing, for enclosing the snap action bimetal and auxiliary positive characteristic thermistor;
   wherein the snap action bimetal is composed of a movable contact plate for oscillating a movable contact point, a bimetal, and a plate spring of semicircular section interposed between first support point of the movable contact plate and second support point of the bimetal.

2. The starter of single-phase induction motor of claim 1, wherein the snap action bimetal is a bimetal processed by drawing.

3. The starter of single-phase induction motor of claim 1, wherein the snap action bimetal is a bimetal processed by forming in a circular form in the center.

* * * * *